United States Patent
Yoshino et al.

(10) Patent No.: US 9,667,851 B2
(45) Date of Patent: May 30, 2017

(54) CAMERA WITH COMMUNICATION UNIT THAT COMMUNICATES WITH EXTERNAL DEVICE

(71) Applicant: NIKON CORPORATION, Tokyo (JP)

(72) Inventors: Kaoru Yoshino, Tokyo (JP); Hiroshi Kasai, Kawasaki (JP); Tomoyuki Sashima, Tokyo (JP); Mayuko Ito, Kawasaki (JP); Kaori Tsuruta, Kamakura (JP); Masakazu Sekiguchi, Kawasaki (JP); Hiroshi Kamehara, Yokohama (JP); Yu Murakoshi, Niiza (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/762,357

(22) PCT Filed: Nov. 21, 2013

(86) PCT No.: PCT/JP2013/081433
§ 371 (c)(1),
(2) Date: Sep. 16, 2015

(87) PCT Pub. No.: WO2014/115414
PCT Pub. Date: Jul. 31, 2014

(65) Prior Publication Data
US 2016/0014317 A1    Jan. 14, 2016

(30) Foreign Application Priority Data

Jan. 24, 2013 (JP) .................................. 2013-010759
Jan. 24, 2013 (JP) .................................. 2013-010760
Jan. 24, 2013 (JP) .................................. 2013-010761

(51) Int. Cl.
H04N 5/232    (2006.01)
H04N 5/225    (2006.01)
H04N 7/18     (2006.01)

(52) U.S. Cl.
CPC ....... *H04N 5/23203* (2013.01); *H04N 5/2251* (2013.01); *H04N 5/2252* (2013.01);
(Continued)

(58) Field of Classification Search
CPC ............ H04N 5/23203; H04N 5/2251; H04N 5/23258; H04N 5/23216; H04N 5/2252;
(Continued)

(56) References Cited

U.S. PATENT DOCUMENTS 7,710,490 B2 * 5/2010 Hara .................. H04N 1/00347
                                                  348/211.1
2003/0090573 A1 * 5/2003 Tojo .................. H04N 1/00888
                                                  348/207.2
(Continued)

FOREIGN PATENT DOCUMENTS

EP    1725021 A2    11/2006
JP    2003-172862 A    6/2003
(Continued)

OTHER PUBLICATIONS

Feb. 10, 2014 International Search Report issued in Application No. PCT/JP2013/081433.
(Continued)

*Primary Examiner* — Gevell Selby
(74) *Attorney, Agent, or Firm* — Oliff PLC

(57) ABSTRACT

An electronic device includes: an operation unit; a detection unit that detects a position or an orientation; a communication unit that communicates with an external device including an image capture unit; and a storing unit that stores image data, wherein the communication unit receives image
(Continued)

data generated by the image capture unit from the external device after transmitting information instructing the image capture unit included in the external device to capture an image in response to an operation of the operation unit, and the storing unit stores the image data received and information on the position detected by the detection unit or information on the orientation detected by the detection unit.

22 Claims, 16 Drawing Sheets

(52) U.S. Cl.
CPC ..... *H04N 5/23206* (2013.01); *H04N 5/23216* (2013.01); *H04N 5/23258* (2013.01); *H04N 5/23287* (2013.01); *H04N 7/185* (2013.01)

(58) Field of Classification Search
CPC . H04N 5/23287; H04N 5/23206; H04N 7/185
See application file for complete search history.

(56) References Cited

U.S. PATENT DOCUMENTS

| | | | | |
|---|---|---|---|---|
| 2004/0264375 | A1* | 12/2004 | Kim | ........................ H04N 7/142 370/232 |
| 2006/0099995 | A1* | 5/2006 | Kim | ..................... H04M 1/0214 455/566 |
| 2006/0103730 | A1* | 5/2006 | Jung | .................... H04N 5/23203 348/207.99 |
| 2007/0126883 | A1 | 6/2007 | Ishige et al. | |
| 2007/0268382 | A1 | 11/2007 | Shiomi | |
| 2007/0285498 | A1 | 12/2007 | Shiomi | |
| 2011/0074964 | A1* | 3/2011 | Hada | ..................... H04N 1/2112 348/211.2 |
| 2011/0109789 | A1 | 5/2011 | Himuro et al. | |
| 2012/0026383 | A1 | 2/2012 | Odagaki | |
| 2013/0077932 | A1* | 3/2013 | Cornell | ................... H04N 5/232 386/227 |

FOREIGN PATENT DOCUMENTS

| | | |
|---|---|---|
| JP | 2003-337374 A | 11/2003 |
| JP | 2004-088396 A | 3/2004 |
| JP | 2006-041952 A | 2/2006 |
| JP | 2007-306224 A | 11/2007 |
| JP | 2007-336527 A | 12/2007 |
| JP | 2009-004511 A | 1/2009 |
| JP | 2011-114390 A | 6/2011 |
| JP | 2012-032704 A | 2/2012 |
| WO | 2010/005975 A1 | 1/2010 |

OTHER PUBLICATIONS

Jun. 13, 2016 Search Report issued in European Patent Application No. 13872539.5.

* cited by examiner

CAMERA WITH COMMUNICATION UNIT THAT COMMUNICATES WITH EXTERNAL DEVICE

TECHNICAL FIELD

The present invention relates electronic devices, a storing method, and cameras.

BACKGROUND ART

There has been conventionally known a photographing device having two units detachable from/attachable to each other, wherein the two units can be used in a combined state and in a detached state (e.g., see Patent Document 1).

PRIOR ART DOCUMENTS

Patent Documents

Patent Document 1: Japanese Patent Application Publication No. 2007-336527

SUMMARY OF THE INVENTION

Problems to be Solved by the Invention

However, the photographing device disclosed in Patent Document 1 has not been made in view of factors such as heat and magnetism that may affect the operation of the device.

The present invention has been made in view of the above problems, and aims to provide an image capture device that takes factors that may affect the operation or the like into consideration.

MEANS FOR SOLVING THE PROBLEMS

Effects of the Invention

The image capture device of the present invention has an effect on providing an image capture device that takes factors that may affect operation or the like into consideration.

BRIEF DESCRIPTION OF DRAWINGS

FIG. 1B is in a detached state;

MODES FOR CARRYING OUT THE INVENTION

First Embodiment

Figure 1A:
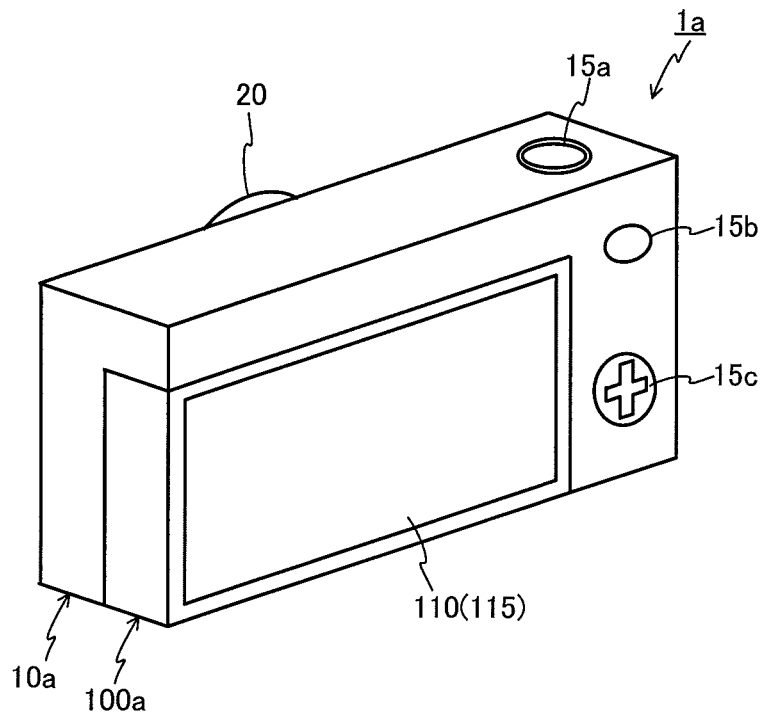
FIG. 1A is a perspective view of an image capture device in accordance with a first embodiment viewed from the rear side.
Figure 1B:
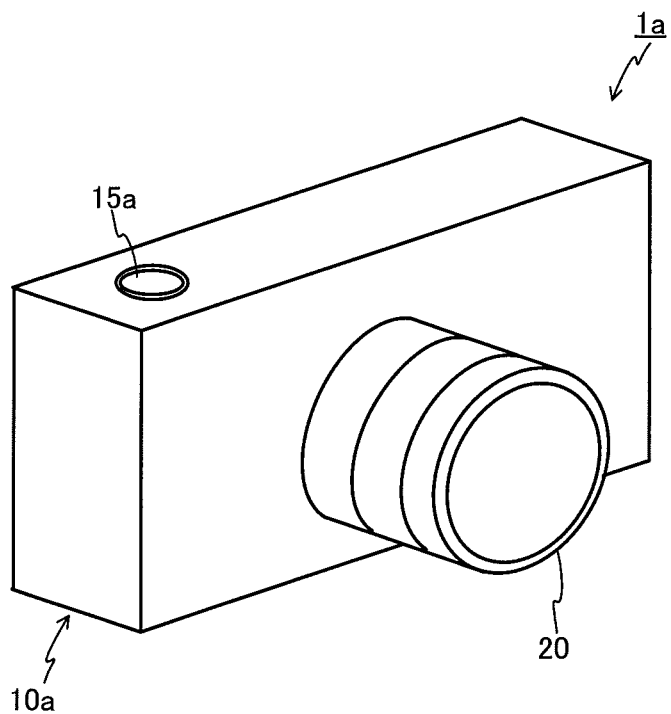
FIG. 1B is a perspective view of the image capture device viewed from the front side.

Hereinafter, a description will be given of an image capture device in accordance with a first embodiment based on FIG. 1A~FIG. 6. FIG. 1A is a perspective view of an image capture device 1a of the first embodiment viewed from the rear side, and FIG. 1B is a perspective view of the image capture device 1a viewed from the front side.

Figure 2:
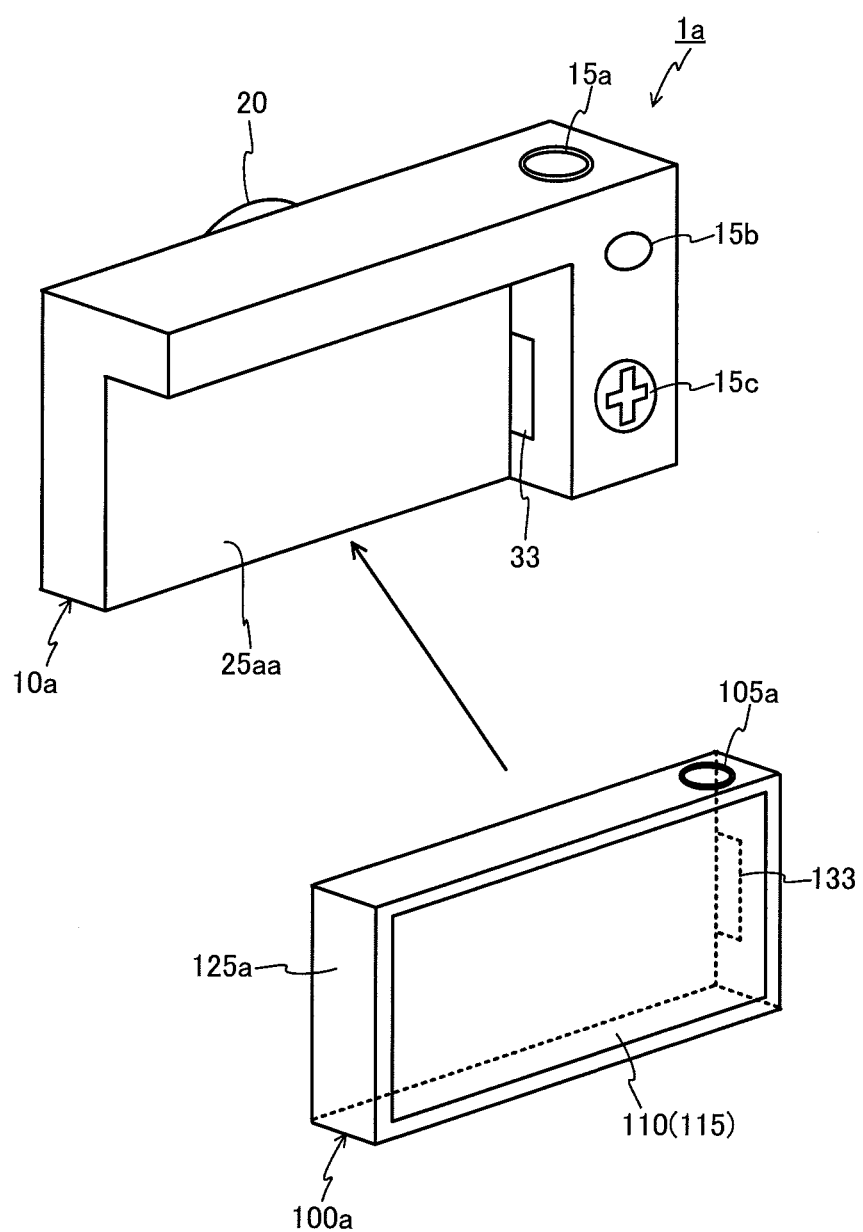
FIG. 2 illustrates a state where the image capture device of FIG. 1A.

As illustrated in these drawings, the image capture device 1a includes a first unit 10a and a second unit 100a. The first unit 10a and the second unit 100a can transition between a state where they are combined (a combined state) as illustrated in FIG. 1A, FIG. 1B and a state where they are detached from each other as illustrated in FIG. 2 (a detached state). When the units 10a, 100a are in the combined state, the second unit 100a can be attached to an attachment portion 25aa of the first unit 10a.

Figure 3:
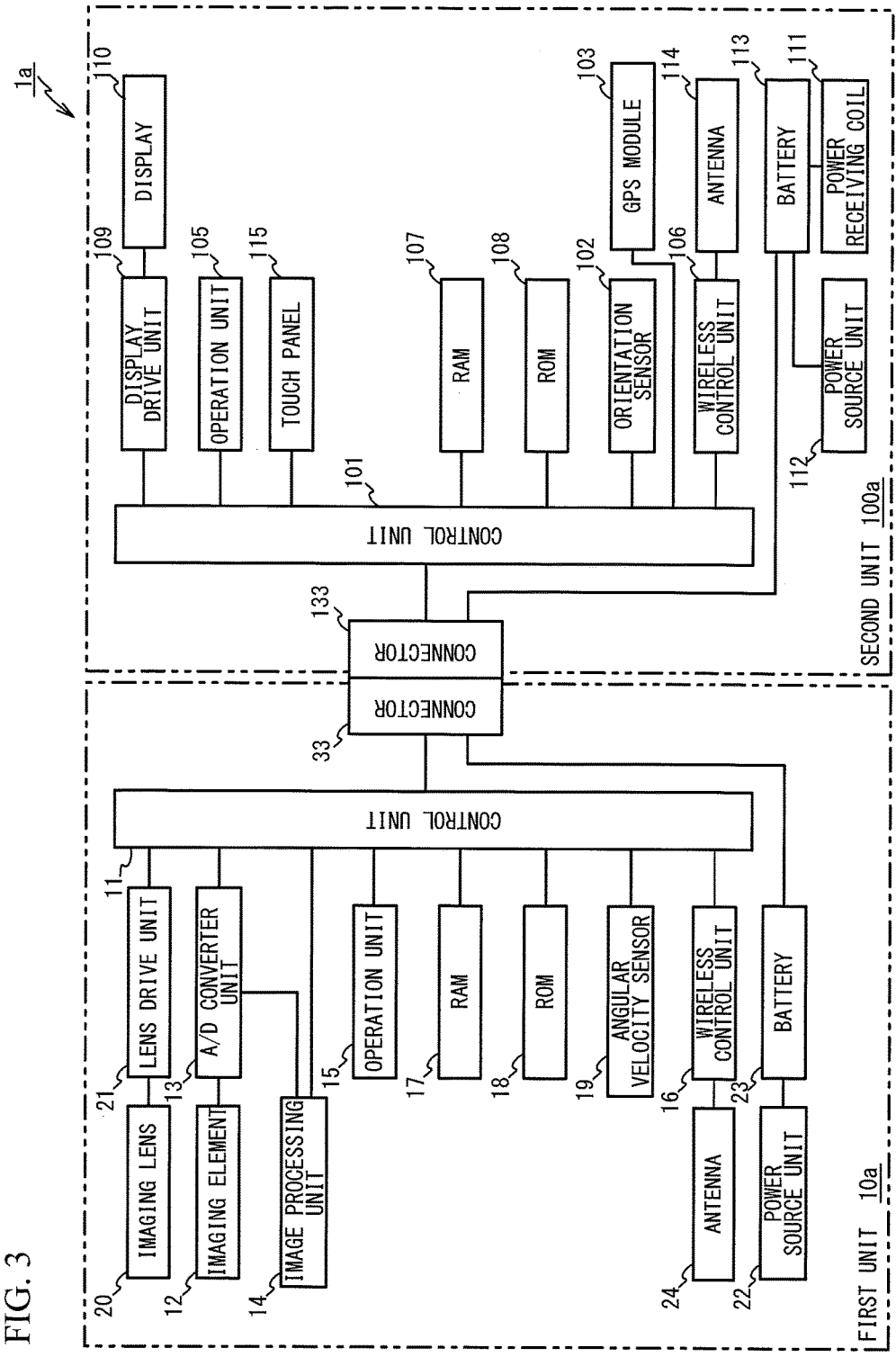
FIG. 3 is a block diagram illustrating a configuration of the image capture device of the first embodiment (in a combined state)
Figure 4:
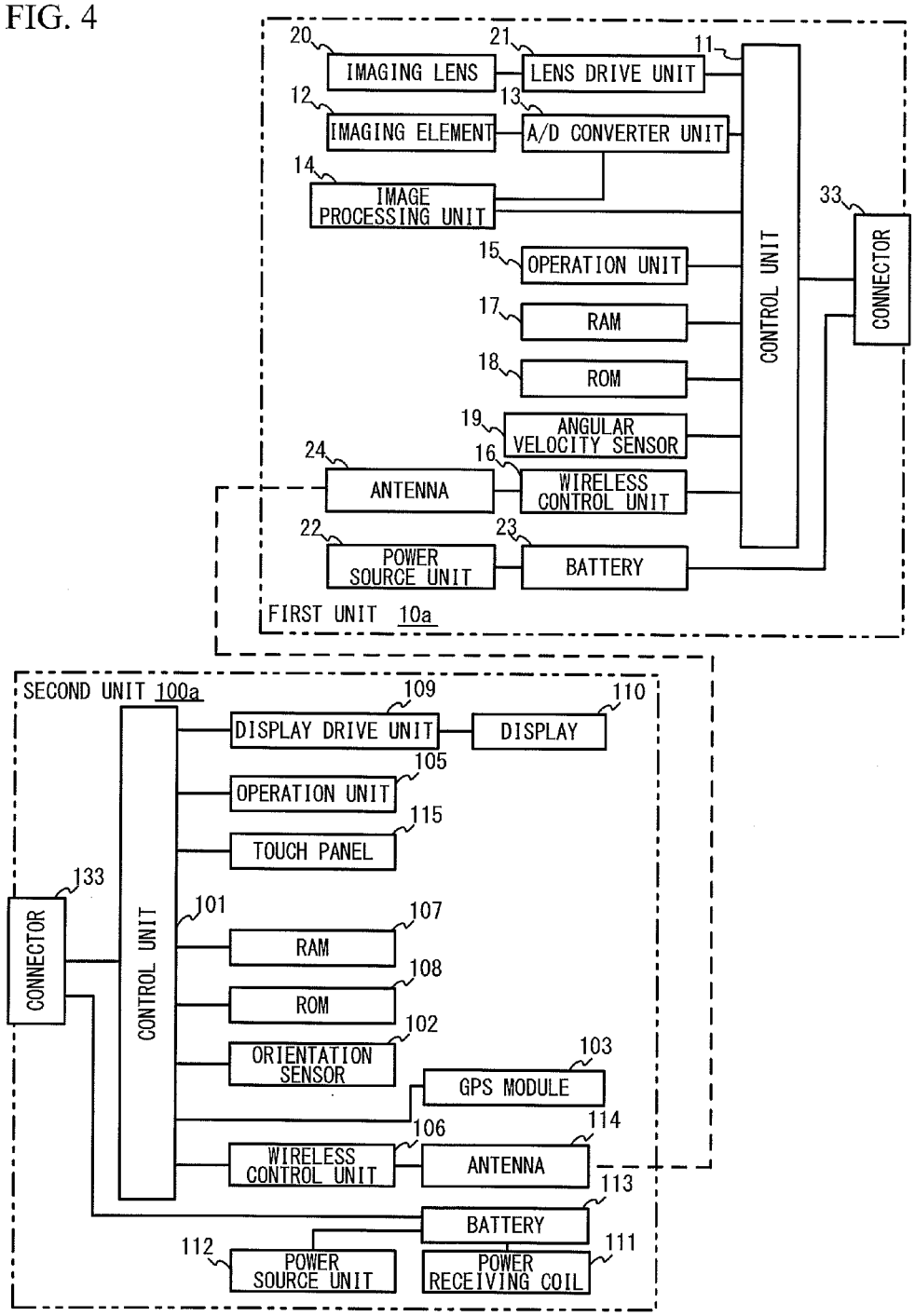
FIG. 4 is a block diagram illustrating a configuration of the image capture device of the first embodiment (in the detached state)
Figure 5:
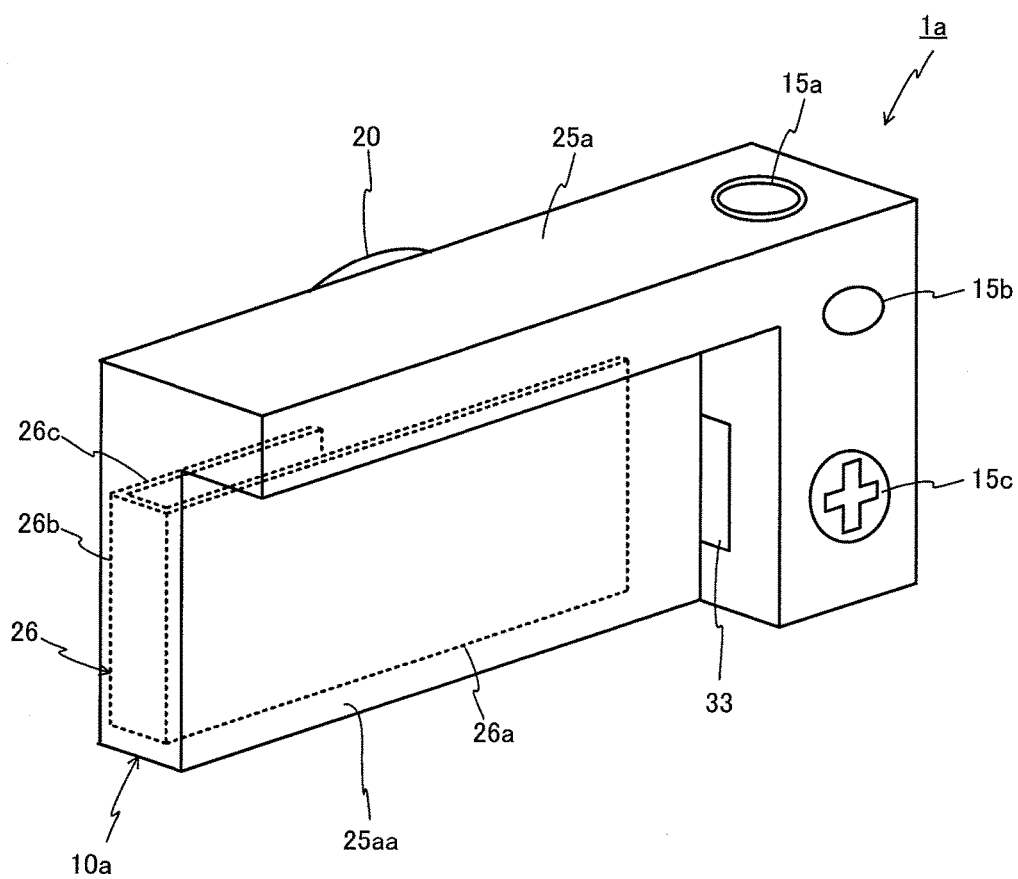
FIG. 5 illustrates a heat release plate located inside the image capture device of the first embodiment.

Hereinafter, a description will be given of the configurations of the first unit 10a and the second unit 100a. FIG. 3 is a block diagram of the units 10a, 100a (in the combined state). In addition, FIG. 4 is a block diagram of the units 10a, 100a (in the detached state).

(First Unit 10a)

The first unit 10a includes, as illustrated in FIG. 3, a control unit 11, an imaging lens 20, a lens drive unit 21, an imaging element 12, an A/D converter unit 13, an image processing unit 14, an operation unit 15, a RAM 17, a ROM 18, an angular velocity sensor 19, a battery 23, a power source unit 22, a wireless control unit 16, an antenna 24, and a connector 33.

The control unit 11 includes a CPU, and is connected to the components in the first unit 10a to control the overall operation of the first unit 10a. In the first embodiment, the control unit 11 identifies whether the first unit 10a and the second unit 100a are in the combined state or in the detached state, and carries out the control corresponding to each state.

The imaging lens 20 is composed of lens groups including, for example, a zoom lens and a focusing lens, and provides the image of a subject on the imaging area of the imaging element 12. The imaging lens 20 may be interchangeable to the first unit 10a. The imaging lens 20 is driven by the lens drive unit 21 under the control of the control unit 11.

The imaging element 12 includes a CMOS image sensor where photosensitive elements are arranged in a matrix in the imaging area or the like, and generates an analog image signal. The A/D converter unit 13 converts the analog image signal generated by the imaging element 12 into a digital image signal, and inputs it to the image processing unit 14.

The image processing unit 14 is a circuit performing various types of image processing (color interpolation processing, gradation converting processing, contour emphasis processing, white balance adjusting processing, image compression processing, image decompression processing, and the like) on the data of the digital image signal input from the A/D converter unit 13. The output from the image processing unit 14 is input to the control unit 11.

The RAM 17 is coupled to the control unit 11, and is used not only as a temporary storage area for the process by the control unit 11 but also as a buffer area for transferring data from the first unit 10a to the second unit 100a.

The ROM 18 is, for example, a non-volatile semiconductor memory, and stores control programs for the first unit 10a executed by the control unit 11 and various parameters. Furthermore, the ROM 18 stores image data of still images and moving images generated by the image processing unit 14.

The operation unit 15 includes operating buttons and switches, and has functions to receive various operations from the user. In the first embodiment, the operation unit 15 includes a release switch 15a, a menu button 15b, and a cross key (multi-selector) 15c. The operation unit 15 may include a touch panel that receives an operation of inputting information in response to the touch by the user.

The angular velocity sensor 19 is a sensor that detects angular velocity generated in the first unit 10a. The detection value (angular velocity) of the angular velocity sensor 19 is input to the control unit 11. The control unit 11 corrects camera shake, with a publicly known camera shake correction technique, by moving (shifting) a part of the imaging lens 20 or the imaging element 12 based on the angular velocity detected by the angular velocity sensor 19.

The battery 23 is, for example, a secondary battery such as a lithium-ion battery. The battery 23 is connected to the connector 33. The power source unit 22 is connected to the battery 23, and converts the voltage generated by the battery 23 into the voltages used in the components such as the control unit 11 to provide them to the components.

The wireless control unit 16 is coupled to the control unit 11, and controls wireless communication with an external device such as the second unit 100a via the antenna 24.

The connector 33 is coupled to the control unit 11, and is connected to the connector 133 of the second unit 100a when the first unit 10a and the second unit 100a are in the combined state. The control unit 11 can recognize that the units 10a, 100a become in the combined state when the connector 33 and the connector 133 become interconnected. Additionally, in a state where the connector 33 and the connector 133 are interconnected, data transmission/reception between the control unit 11 and a control unit 101 of the second unit 100a is possible. Furthermore, in the state where the connector 33 and the connector 133 are interconnected, the exchange of the electrical power between the battery 23 and a battery 113 of the second unit 100a is possible.

In the first embodiment, most of the components of the first unit 10a is accommodated inside a first housing 25a. The first housing 25a is made of a metal such as magnesium, and includes a heat release plate 26 located thereinside as indicated by the dashed line in FIG. 5.

Figure 6:
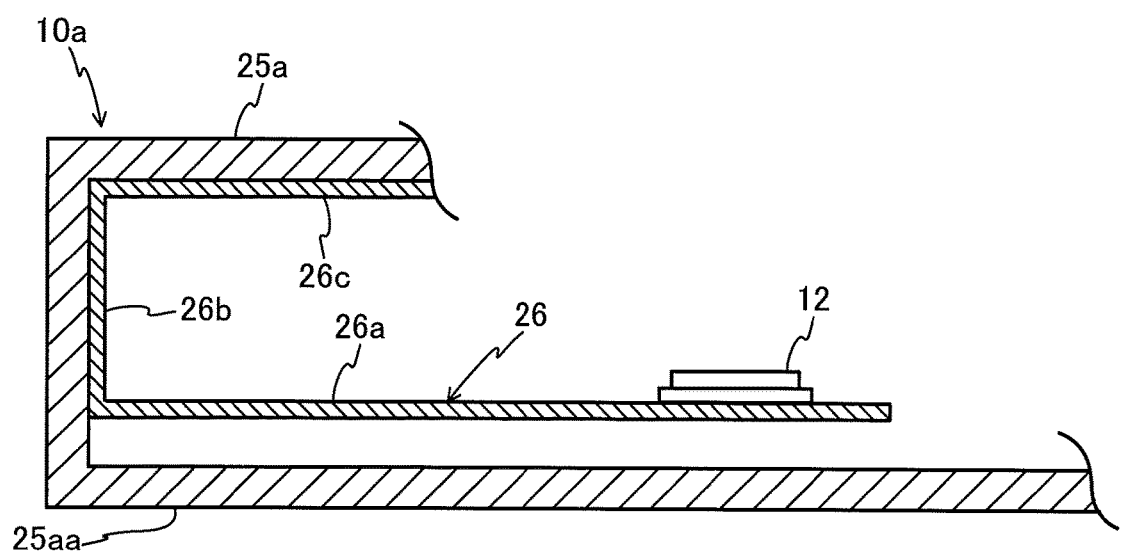
FIG. 6 is a partial cross-sectional view of the image capture device of the first embodiment.

The heat release plate 26 is shaped by bending a rectangular plate member at two points (substantial U-shaped). Flat parts of the heat release plate 26 are referred to as a first part 26a, a second part 26b, and a third part 26c. The material for the heat release plate 26 is a material with high heat conductivity such as an aluminum alloy, SUS (stainless steel), a copper alloy, a magnesium alloy, a zinc alloy, or a graphite sheet. Additionally, the heat release plate 26 contacts a portion other than the attachment portion 25aa of the first housing 25a in the second part 26b and the third part 26c as illustrated in FIG. 6 that is a partial cross-sectional view of FIG. 5. The heat release plate 26 holds the imaging element 12 in the first part 26a and the image processing unit 14 (the image processing unit 14 is not illustrated in FIG. 6).

In the first embodiment, the imaging element 12 and the image processing unit 14 are the components that generate especially a lot of heat among the components of the image capture device 1a. The heat generated in the imaging element 12 and the image processing unit 14 conducts from the back side of the imaging element 12 to the first part 26a of the heat release plate 26, further conducts through the heat release plate 26 to the second part 26b and the third part 26c, and also conducts to the first housing 25a made of a metal. Then, the heat is released from the entire surface (especially the portion other than the attachment portion 25aa) of the first housing 25a.

As described above, the first unit 10a can efficiently release heat generated in the imaging element 12 and the image processing unit 14 from the entire surface of the first housing 25a. This reduces the increase in temperatures of the imaging element 12 and the image processing unit 14, thus reducing the generation of heat noise and the deterioration of image quality. In addition, in the first embodiment, the heat release plate 26 contacts the first housing 25a in a portion other than the attachment portion 25aa, and thus can efficiently release heat from the surface of the first housing 25a even in a state where the second unit 100a is attached to the attachment portion 25aa (in the combined state illustrated in FIG. 1A, FIG. 1B). In addition, thermal effects on the second unit 100a can be reduced.

(Second Unit 100a)

The second unit 100a includes, as illustrated in FIG. 3, the control unit 101, a display 110, a display drive unit 109, a RAM 107, a ROM 108, an operation unit 105, a touch panel 115, an orientation sensor 102, a GPS module 103, a power receiving coil 111, the battery 113, a power source unit 112, a wireless control unit 106, an antenna 114, and a connector 133.

The control unit 101 includes a CPU, and is coupled to the components in the second unit 100a to control the overall operation of the second unit 100a. In the first embodiment, the control unit 101 identifies whether the units 10a, 100a are in the combined state or in the detached state, and carries out the control corresponding to each state.

The display 110 includes a liquid crystal panel, an organic EL panel, or the like, and displays images and an operation menu screen. The display 110 is driven by the display drive unit 109 under the control by the control unit 101.

The operation unit 105 receives various operations by the user, and includes a release switch 105a illustrated in FIG. 2. The touch panel 115 is located on the surface of the display 110, and receives an operation of inputting information in response to the touch by the user.

The RAM 107 is coupled to the control unit 101, and is used as a temporary storage area for the process by the control unit 101. The ROM 108 is, for example, a non-volatile semiconductor memory, is coupled to the control unit 101, and stores control programs for the second unit 100a executed by the control unit 101 and various parameters. Furthermore, the ROM 108 stores image data of still images and moving images transferred from the first unit 10a.

The orientation sensor 102 detects magnetism (geomagnetism) from the outside of the second unit 100a, and obtains the orientation of the second unit 100a (the orientation indicated by the reference axis of the second unit 100a). The information on the orientation of the second unit 100a obtained by the orientation sensor 102 is displayed on the display 110. In addition, the information on the orientation is stored in the ROM 18 or the ROM 108 together with the image data of a still image or a moving image in accordance with the operation (setting) of the operation unit 105 by the user.

The GPS module 103 includes an antenna for receiving radio waves from GPS (Global Positioning System) satellites, and detects positional information (such as latitude and longitude) of the second unit 100a. The positional information detected by the GPS module 103 is displayed on the display 110. Additionally, the positional information is stored in the ROM 18 or the ROM 108 together with the image data of a still image or a moving image in accordance with the operation (setting) of the operation unit 105 by the user.

The power receiving coil 111 develops an electromotive force by magnetic flux from an external power transmission coil with a non-contact power feeding system (wireless power feeding system) to charge the battery 113 (an electromagnetic induction system). The wireless power feeding system may be an electromagnetic field resonance system, or a radio wave system instead of the above electromagnetic induction system.

The battery 113 is, for example, a secondary battery such as a lithium-ion battery. The battery 113 is coupled to the connector 133, and supplies electrical power to the battery 23 via the connector 133 and the connector 33. The power source unit 112 is coupled to the battery 113, and converts the voltage generated in the battery 113 into the voltages used in the components such as the control unit 101 to provide them to the components.

The wireless control unit 106 is coupled to the control unit 101, and controls wireless communication with an external device such as the first unit 10a via the antenna 114.

The connector 133 is coupled to the control unit 101, and is connected to the connector 33 when the first unit 10a and the second unit 100a are in the combined state as described previously.

In the first embodiment, the components other than the display 110, the operation unit 105, and the touch panel 115 are accommodated inside a second housing 125a (see FIG. 2) among the above components of the second unit 100a. Here, at least a part of the second housing 125a is formed of a non-metal member such as a resin. Accordingly, even when the electronic components, such as the orientation sensor 102, the GPS module 103, and the power receiving coil 111, which function by receiving magnetism or radio waves, are accommodated inside the second housing 125a, the operation of the electronic components is prevented from being disturbed by the second housing 125a. That is to say, the decrease in radio wave receiving sensitivity of the GPS module 103 (this is considered to occur because magnetic flux generated around the GPS module 103 is absorbed to the housing and the resonance phenomenon is disturbed), the decrease in sensitivity of the orientation sensor 102, and the decrease in electromotive force by the power receiving coil 111, which occur when the above electronic components are accommodated inside a high-conductive housing made of a metal, can be avoided. All of the second housing 125a may be formed of a non-metal member such as a resin, or portions around the above electronic components may be formed of a non-metal member such as a resin.

In the first embodiment, as illustrated in FIG. 1A and FIG. 1B, when the first unit 10a and the second unit 100a are in the combined state, the operation and the processing similar to those of a typical image capture device are performed by the collaborative operation of the control units 11, 101. In addition, when the first unit 10a and the second unit 100a are in the detached state (in the state illustrated in FIG. 2 and FIG. 4), the first unit 10a can independently perform an image capture process. In addition, in the detached state, the second unit 100a can independently perform a display process (a process allowing the user to view data of a still image or data of a moving image stored in the ROMs 18, 108). Additionally, in the detached state, the second unit 100a can be used to remotely operate the first unit 10a to capture an image as a remote control of the first unit 10a. The wireless control units 16, 106 control the exchange of data between the units 10a and 100a in the detached state (see FIG. 4). In addition, the control units 11, 101 can determine whether the units 10a, 100a are in the combined state or in the detached state by determining whether the connectors 33, 133 are interconnected. However, this does not intend to suggest any limitation, and a mechanical switch or a sensor (such as an IC tag reader) may be used to determine whether they are in the combined state or in the detached state.

As described in detail above, according to the first embodiment, the first housing 25a of the first unit 10a is formed of a metal member that releases heat generated in the imaging element 12 and the image processing unit 14, and the second housing 125a of the second unit 100a accommodates the electronic components (102, 103, 111) that function by receiving magnetism or radio waves thereinside, and at least a part of the second housing 125a is formed of a non-metal member that passes magnetism and radio waves. Additionally, in the first embodiment, the second unit 100a functions in a state where the second unit 100a is combined with the first unit 10a, and independently functions also in a state where the second unit 100a is detached from the first unit 10a. Therefore, the first embodiment allows the effect of heat generated in the imaging element 12 and the image processing unit 14 in the first unit 10a to be reduced, and allows the components to effectively function by providing the electronic components (102, 103, 111) in the second unit 100a. In addition, the usability of the user can be improved by appropriately arranging the features for releasing heat and the electronic components in the units 10a, 100a, which function both in the combined state and in the detached state, with consideration for factors that may affect the operation.

Additionally, in the first embodiment, the second unit 100a includes the display 110. Accordingly, an image captured by the imaging element or a through image (a live view image) can be displayed on the display 110 in the combined state. In addition, in the detached state, a captured image or an image used to remotely operate the first unit 10a can be displayed on the display 110.

In addition, in the first embodiment, the first unit 10a includes the heat release plate 26 that conducts heat generated in the imaging element 12 and the image processing unit 14 to the first housing 25a (a metal portion). This allows the heat generated in the imaging element 12 and the image processing unit 14 to be efficiently released in the metal portion of the first housing 25a. In addition, in the embodiment, the heat release plate 26 contacts a portion different from the attachment portion 25aa of the first housing 25a, and conducts heat generated in the imaging element 12 and the image processing unit 14 to the first housing 25a (the metal portion). This enables to prevent the heat generated in the imaging element 12 and the image processing unit 14 from influencing the second unit 100a, and also enables to efficiently release heat even when the units 10a, 100a are in the combined state.

The above first embodiment describes a case where the imaging element 12 and the image processing unit 14 are located on the heat release plate 26, but does not intend to suggest any limitation. For example, only the imaging element 12 may be located on the heat release plate 26. Alternatively, components other than the imaging element 12 and the image processing unit 14 may be located on the heat release plate 26.

The above first embodiment describes a case where the heat release plate 26 is located inside the first housing 25a, but does not intend to suggest any limitation. For example, the imaging element 12 and the image processing unit 14 may directly contact the first housing 25a (a metal portion).

The above first embodiment describes a case where the orientation sensor 102, the GPS module 103, and the power receiving coil 111 are employed as an electronic component that functions by receiving magnetism or radio waves, but other electronic components may be employed.

At least one of the orientation sensor 102, the GPS module 103, and the power receiving coil 111 described in the above first embodiment may be located in the first unit 10a. In this case, a part of the first housing 25a is preferably formed of a non-metal such as a resin.

In the above first embodiment, all of the first housing 25a may be formed of a metal member, or only a part of the first housing 25a may be formed of a metal member. Additionally, all of the second housing 125a may be formed of a non-metal member, or only a part of the second housing 125a may be formed of a non-metal member.

The above first embodiment describes a case where the battery 23 is connected to the battery 113 in the combined state, but does not intend to suggest any limitation. The battery 23 may be connected to the power receiving coil 111 to charge the battery 23.

Second Embodiment

Figure 7:
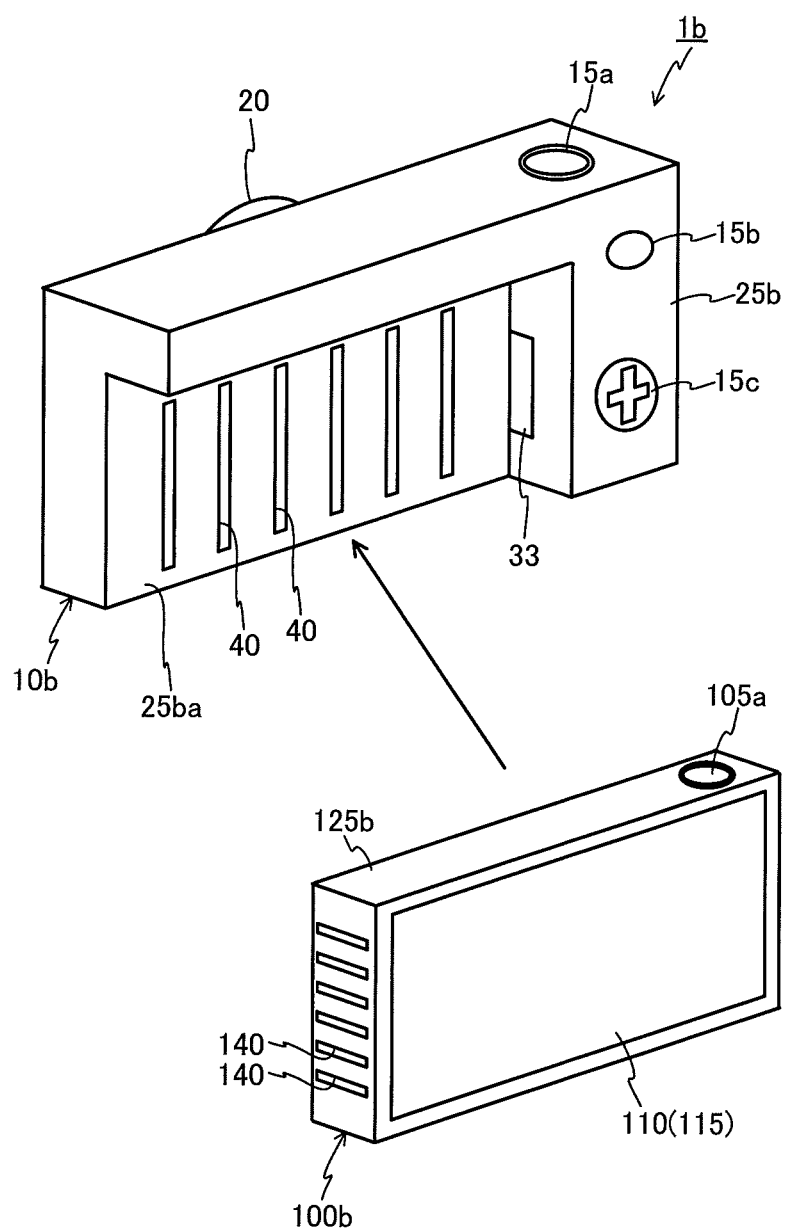
FIG. 7 is a perspective view of an image capture device in accordance with a second embodiment (in the detached state)
Figure 8:
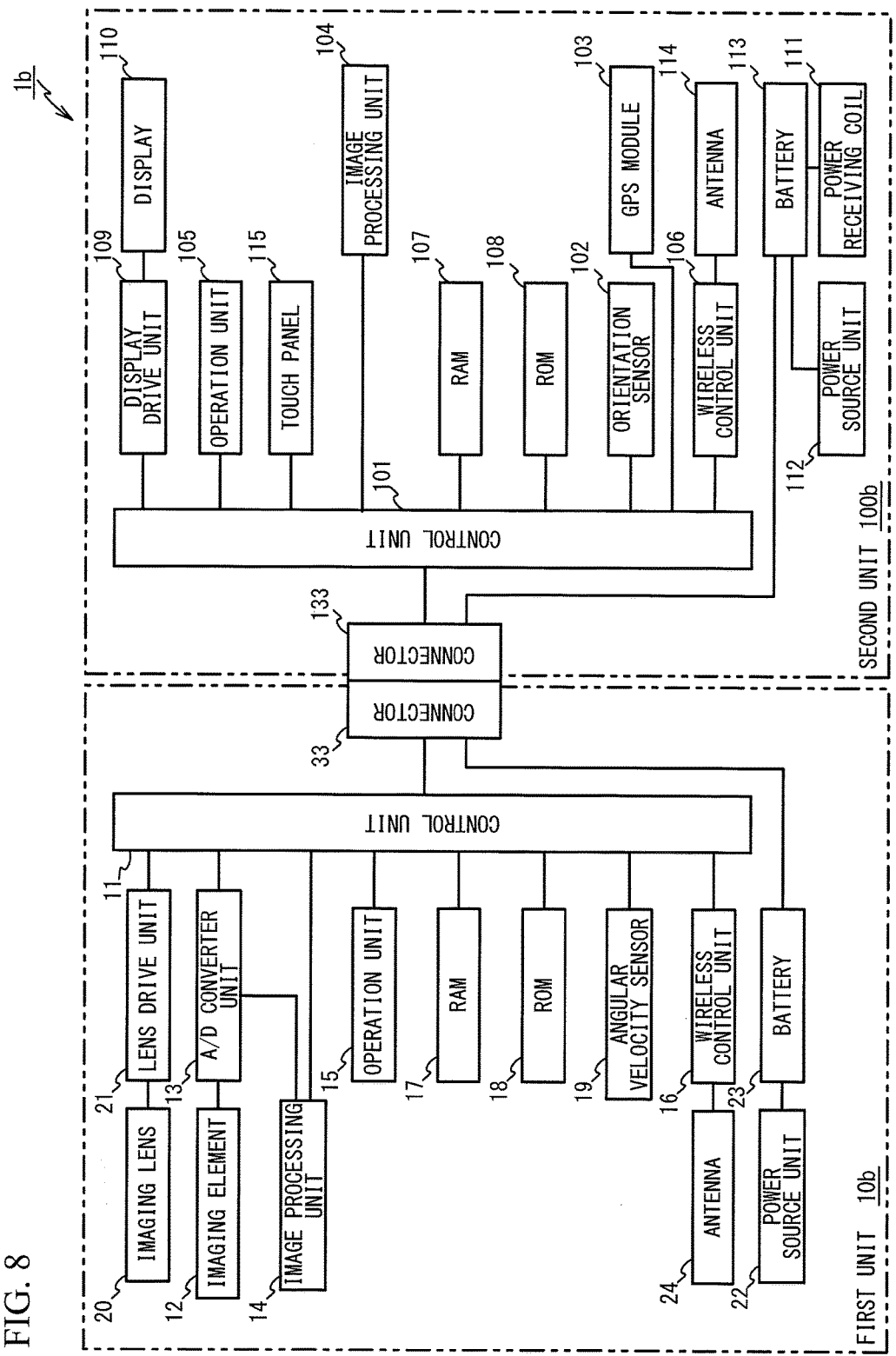
FIG. 8 is a block diagram illustrating a configuration of the image capture device of the second embodiment.

A description will next be given of an image capture device in accordance with a second embodiment based on FIG. 7~FIG. 9. FIG. 7 is a perspective view of an image capture device 1b of the second embodiment (in the detached state). FIG. 8 is a block diagram illustrating a configuration of the image capture device 1b.

As illustrated in FIG. 7 and FIG. 8, in the second embodiment, the image capture device 1b includes a first unit 10b and a second unit 100b. As is clear from the comparison between FIG. 8 and FIG. 3, the second unit 100b includes an image processing unit 104 (see the bold line part) in the second embodiment. Additionally, as is clear from the comparison between FIG. 7 and FIG. 2, slit-like heat release openings 40 are located in an attachment portion 25ba of a first housing 25b of the first unit 10b and slit-like heat release openings 140 are located in a second housing 125b of the second unit 100b in the second embodiment. Other structures are the same as those of the above first embodiment. In the second embodiment, the heat release plate 26 described in the first embodiment may be located or may not be located inside the first housing 25b.

The image processing unit 104 is a circuit that performs various types of image processing (color interpolation processing, gradation converting processing, contour emphasis processing, white balance adjusting processing, image compression processing, image decompression processing, and the like) on a digital image signal as with the image processing unit 14 described in the first embodiment. The image processing unit 104 is coupled to the control unit 101.

The heat release openings 40 efficiently release heat generated in the first housing 25b (heat generated in the imaging element 12 and the image processing unit 14) to the outside when the units 10b, 100b are in the detached state, where the heat-release efficiency in the combined state is less than that in the detached state because the second unit 100b covers the heat release openings 40. Additionally, the heat release openings 140 release heat generated in the second housing 125b (heat generated in the image processing unit 104) with the same efficiency regardless of whether the units 10b, 100b are in the combined state or in the detached state.

A detailed description will next be given of a process executed by the image capture device 1b of the second embodiment (a process executed by the control units 11, 101) with reference to a flowchart of FIG. 9.

Figure 9:
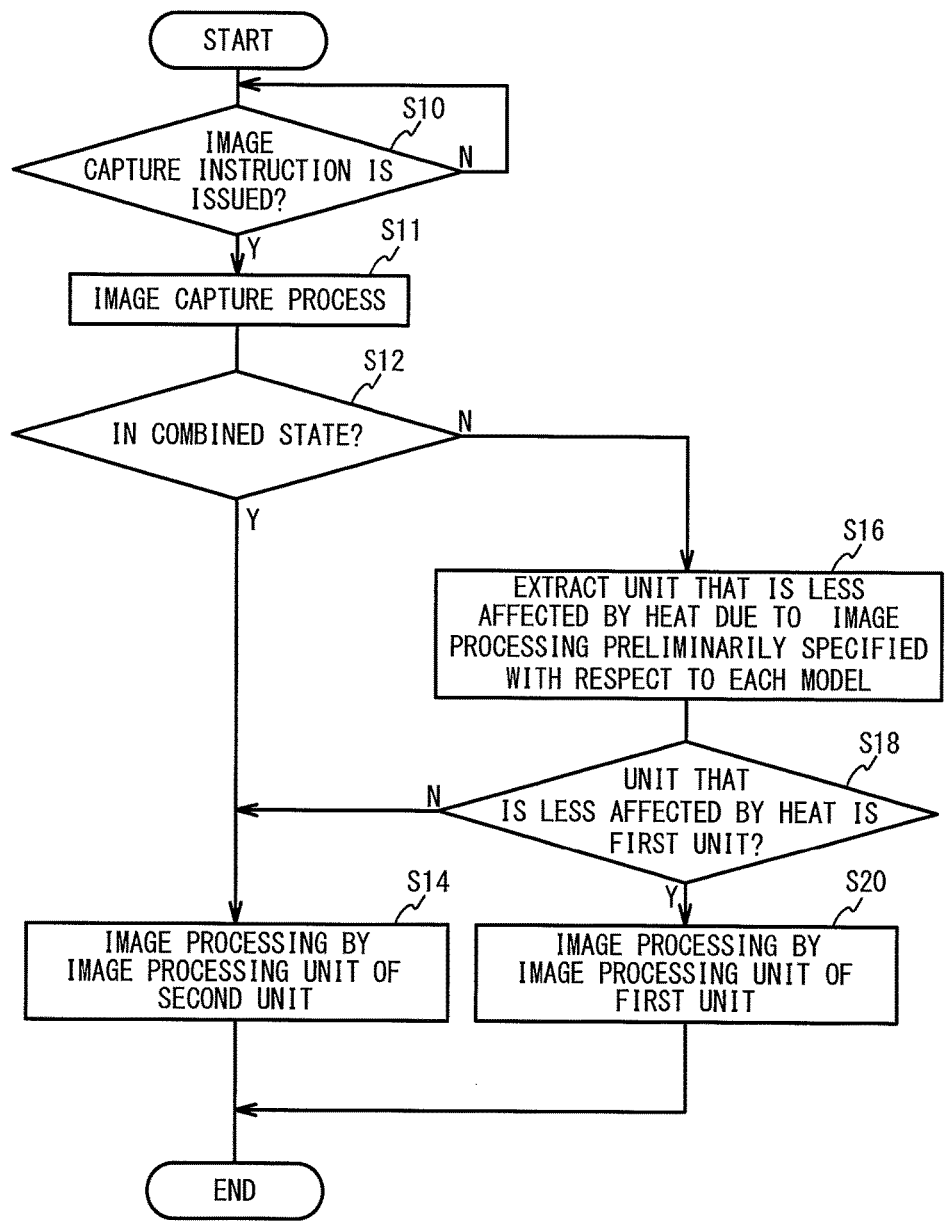
FIG. 9 is a flowchart of a process executed by the image capture device of the second embodiment.

In the process of FIG. 9, at step S10, the control unit 11 and the control unit 101 wait till an image capture instruction is issued from the user. The image capture instruction from the user in this case includes an image capture instruction issued by the press of the release switch 15a or the release switch 105a by the user, and an image capture instruction from the user issued by the operation of the touch panel 115. When the control unit 101 receives an image capture instruction, it transmits the image capture instruction to the control unit 11. In this case, when the units 10b, 100b are in the combined state, the image capture instruction is transmitted via the connectors 33, 133. On the other hand, when the units 10b, 100b are in the detached state, the image capture instruction is transmitted via the wireless control units 106, 16. When an image capture instruction is issued from the user, the process proceeds to step S11.

At step S11, the control unit 11 conducts (starts) image capture using the imaging lens 20 and the imaging element 12. The control unit 11 converts an analog image signal generated by the imaging element 12 into a digital image signal with the A/D converter unit 13 to obtain the digital image signal. The data of the digital image signal obtained by the control unit 11 is raw data (a RAW file) on which image processing is not performed yet.

At subsequent step S12, the control unit 11 determines whether the units 10b, 100b are in the combined state. When the determination here is Yes, the process proceeds to step S14. At step S14, the control unit 11 transmits the data of the digital image signal obtained at step S11 to the control unit 101 of the second unit 100b via the connector 33 and the connector 133. The control unit 101 then transmits the data of the digital image signal to the image processing unit 104. In this case, the image processing unit 104 performs various types of image processing (color interpolation processing, gradation converting processing, contour emphasis processing, white balance adjusting processing, image compression processing, image decompression processing, and the like) on the data of the digital image signal. The image data on which the image processing has been performed is stored in the ROM 108 via the control unit 101. The reason why the image processing unit 104 of the second unit 100b performs image processing when the units 10*b*, 100*b* are in the combined state is because the heat release openings 40 of the first unit 10*b* are covered with the second unit 100*b* in the combined state, and thus the first unit 10*b* may receive thermal influence if the image processing unit 14 of the first unit 10*b* performs the image processing.

On the other hand, when the determination at step S12 is No, i.e., when the units 10*b*, 100*b* are in the detached state, the process proceeds to step S16. At step S16, the control unit 11 extracts a unit that is less affected by heat when the image processing is performed in the detached state, the unit being preliminarily specified with respect to each model of the image capture device. Here, assume that the ROM 18 or the like preliminarily stores data indicating which one of the first unit 10*b* and the second unit 100*b* is less affected by heat due to the image processing, and the control unit 11 reads out the data stored in the ROM 18 or the like at step S16. Assume that this data is created through the experiments or simulations conducted in the designing stage or the manufacturing stage of the image capture device, and stored in the ROM 18 or the like. The heat due to the image processing includes heat generated during the image processing by the image processing unit 14 or 104, and heat generated due to the process associated with the image processing such as heat generated due to the wireless communication by the wireless control units 16, 106.

At subsequent step S18, it is determined whether a unit that is less affected by heat due to the image processing in the detached state is the first unit 10*b*. When the determination here is No, the process proceeds to step S14, and the image processing unit 101 of the second unit 100*b* performs the image processing as described above. On the other hand, when the determination at step S18 is Y, i.e., when the unit that is less affected by heat due to the image processing in the detached state is the first unit 10*b*, the control unit 11 proceeds to step S20.

At step S20, the control unit 11 uses the image processing unit 14 of the first unit 10*b* to perform various types of image processing (color interpolation processing, gradation converting processing, contour emphasis processing, white balance adjusting processing, image compression processing, image decompression processing, and the like) on the data of the digital image signal. In this case, the control unit 11 stores the image data on which the image processing has been performed in the ROM 18.

Then, the process of FIG. 9 is repeated till the power of the image capture device 1*b* is switched off.

As described above, according to the second embodiment, the control unit 11 of the first unit 10*b* selects an image processing unit used to perform image processing from the image processing units 14, 104 in accordance with an effect of heat due to the image processing when the first unit 10*b* and the second unit 100*b* are in the detached state (S18). This allows the second embodiment to use the image processing unit included in the unit that is less affected by heat in the detached state for image processing, thus effectively preventing the degradation of each unit and the decrease in image quality due to the heat.

Additionally, in the second embodiment, the attachment portion 25*ba* of the first housing 25*b* has the heat release openings 40 that release heat generated in the image processing unit 14 included in the first unit 10*b* when the units 10*b*, 100*b* are in the detached state. This enables to reduce the effect of heat by the heat-release effect even when the image processing unit 14 performs image processing in the detached state, and is efficient because the image data does not need to be transmitted from the control unit 11 to the control unit 101 over the radio.

In addition, in the second embodiment, the heat release openings 140 are located in a portion other than the portion that is to be attached to the first housing 25*b* in the second housing 125*b*. This enables to effectively release heat generated in the image processing unit 104 both in the combined state and in the detached state.

Additionally, in the second embodiment, the ROM 18 or the like stores information on which unit of the first unit and the second unit determined is less affected by heat generated due to the image processing with respect to each model, and thus the control unit 11 can appropriately determine which one of the image processing units 14, 104 should be used in the detached state.

The above second embodiment describes a case where the image processing unit 14 or 104 included in a unit that is less affected by heat in the detached state performs image processing, but does not intend to suggest any limitation. For example, the image processing unit 104 of the second unit 100*b* may be used to perform image processing in the combined state because the heat release openings 40 are covered with the second unit 100*b*, while the image processing unit 14 of the first unit 100*a* may be used to perform the image processing in the detached state because the heat release openings 40 are not covered with the second unit 100*b*. This configuration enables to efficiently release heat generated due to the image processing, and allows the image data to be transmitted through a wire via the connectors 33, 133. Thus, it is efficient in transmission.

The above second embodiment describes a case where the heat release openings 40 are located in the attachment portion 25*ba* of the first housing 25*b*, but does not intend to suggest any limitation. The heat release opening 40 may be located in a location other than the attachment portion 25*ba*.

Additionally, the above second embodiment describes a case where the heat release openings 40 are provided to release heat generated in the first housing 25*a*, but a heat release fin, a heat release plate, a Peltier device, or the like may be provided instead of or in addition to the heat release openings 40. The same discussion is applicable to the heat release opening 140 of the second housing 125*b*.

The above second embodiment describes a case where the second unit 100*b* includes the orientation sensor 102, the GPS module 103, and the power receiving coil 111 as with in the first embodiment, but at least one of them may be omitted.

Third Embodiment

Figure 10:
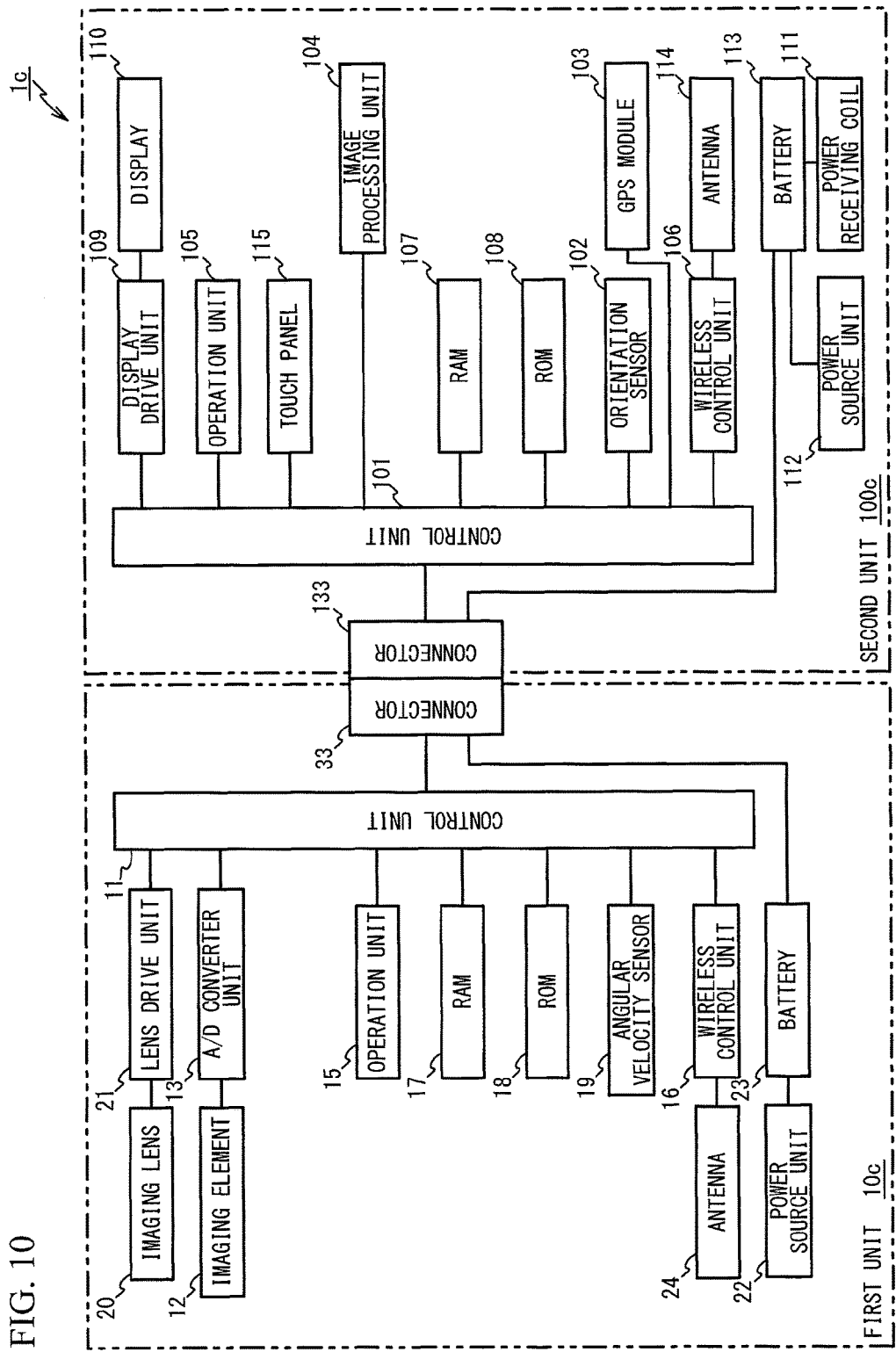
FIG. 10 is a block diagram illustrating a configuration of an image capture device in accordance with a third embodiment.

A detailed description will next be given of a third embodiment based on FIG. 10 and FIG. 11. FIG. 10 is a block diagram illustrating a configuration of an image capture device 1*c* in accordance with the third embodiment.

As illustrated in FIG. 10, the image capture device 1*c* includes a first unit 10*c* and a second unit 100*c*. As is clear from the comparison between FIG. 10 and FIG. 3 (the first embodiment), the image processing unit 14 included in the first unit 10*a* is omitted in the first unit 10*c*. On the other hand, as is clear from the comparison between FIG. 10 and FIG. 3, the second unit 100*c* includes the image processing unit 104. The image processing unit 104 is the same image processing unit as the image processing unit 104 included in the second unit 100*b* of the second embodiment.

A description will next be given of a process executed by the image capture device 1c (a process executed by the control units 11, 101) with reference to a flowchart of FIG. 11.

Figure 11:
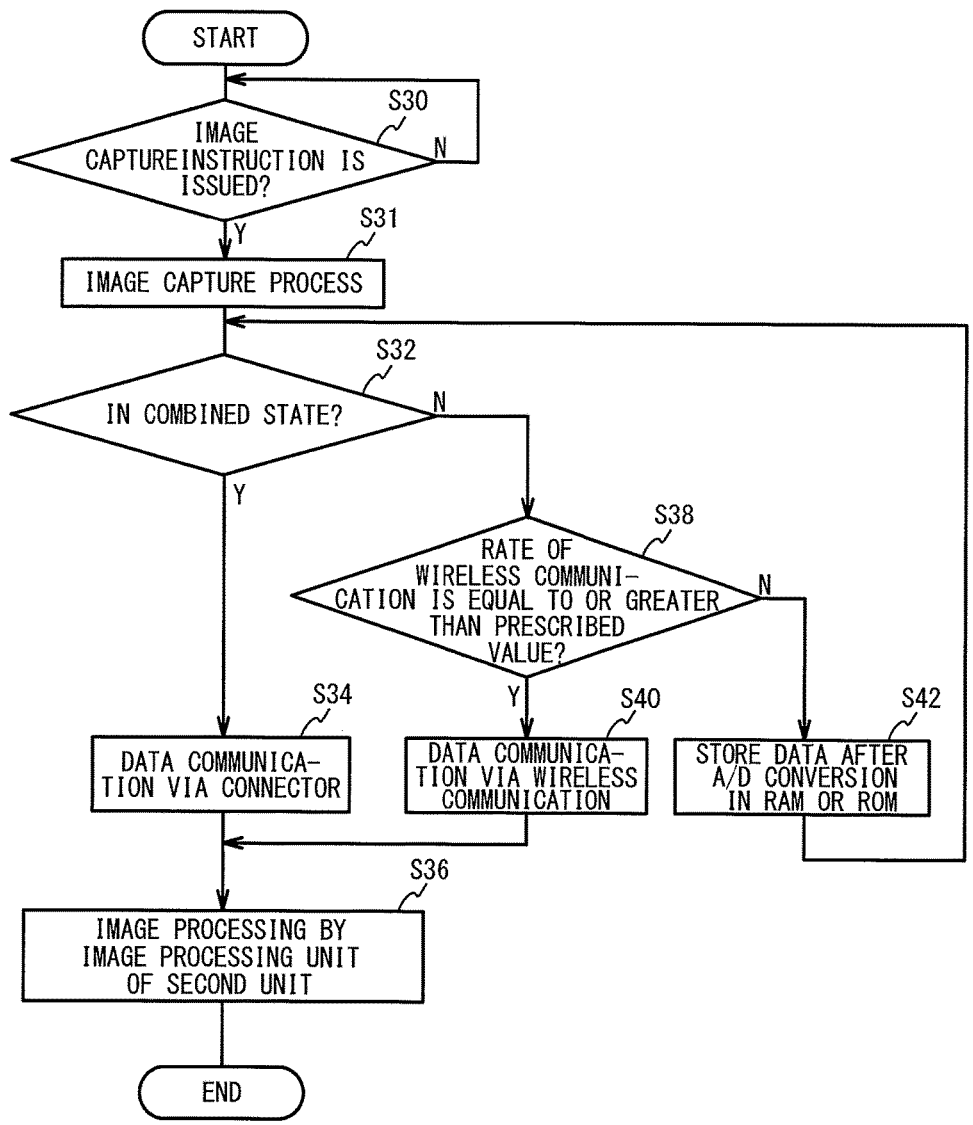
FIG. 11 is a flowchart of a process executed by the image capture device of the third embodiment.

In the process of FIG. 11, at step S30, as with at step S10 of FIG. 9, the control unit 11 and the control unit 101 wait till an image capture instruction is issued from the user. When the control unit 101 receives an image capture instruction, it transmits the image capture instruction to the control unit 11. When an image capture instruction is issued from the user, the process proceeds to step S31.

At step S31, the control unit 11 conducts (starts) image capture using the imaging lens 20 and the imaging element 12 as with at step S11 of FIG. 9.

In this case, the control unit 11 obtains raw data (a RAW file) of a still image or a moving image on which image processing is not performed yet as the data of a digital image signal.

At subsequent step S32, the control unit 11 determines whether the units 10c, 100c are in the combined state as with at step S12 of FIG. 9. When the determination here is Yes, the process proceeds to step S34. At step S34, the control unit 11 transmits the data of the digital image signal obtained at step S31 to the control unit 101 of the second unit 100c via the connector 33 and the connector 133. At subsequent step S36, the control unit 101 uses the image processing unit 104 of the second unit to perform various types of image processing. The control unit 101 stores the image data on which the various types of image processing have been performed in the ROM 108.

On the other hand, when the determination at step S32 is No, i.e., in the case of the detached state, the process proceeds to step S38, and the control unit 11 determines whether the current rate of wireless communication is equal to or greater than a prescribed value by making an inquiry to the wireless control unit 16. The "prescribed value of the rate of wireless communication" is a rate at which digital image data can be transmitted within a predetermined period of time. The predetermined period of time differs depending on the file size of the digital image data or the like.

When the determination at step S38 is Yes, i.e., when the rate of wireless communication is sufficiently fast, the process proceeds to step S40, and the control unit 11 transmits the data of the digital image signal obtained at step S31 to the control unit 101 of the second unit 100c via wireless communication using the wireless control unit 16, the antenna 24, the wireless control unit 106, and the antenna 114. Then, step S36 is performed as described above.

On the other hand, when the determination at step S38 is No, i.e., when the rate of wireless communication is less than the prescribed value, the process proceeds to step S42. At step S42, the control unit 11 temporarily stores the data of the digital image signal obtained at step S31 in the RAM 17 or the ROM 18. After the process at step S42 is ended, the process returns to step S32. When the rate of wireless communication becomes equal to or greater than the prescribed value while the detached state is maintained after the process returns to step S32, the process proceeds to step S40, and the control unit 11 transmits the data temporarily stored in the RAM 17 or the ROM 18 to the control unit 101 via wireless communication. When the detached state transitions to the combined state after the process returns to step S32, the process proceeds to step S34, and the control unit 11 transmits the data temporarily stored in the RAM 17 or the ROM 18 to the control unit 101 via the connectors 33, 133.

As described in detail above, according to the third embodiment, the image data generated by the imaging element 12 is processed in the image processing unit 104 of the second unit 100c whether the first unit 10c and the second unit 100c are in the combined state or in the detached state. This allows the imaging element 12 and the image processing unit 104, which especially generate a lot of heat in the whole of the image capture device 1c, to be separately mounted to different units, thus enabling to separate generation sources of heat. Accordingly, heat generated in the imaging element 12 and the image processing unit 104 can be efficiently released.

Additionally, in the third embodiment, wire communication via the connectors is performed in the combined state, and wireless communication is performed in the detached state. Thus, the efficiency of communication can be improved. However, this does not intend to suggest any limitation, and wireless communication may be also performed in the combined state.

Additionally, in the third embodiment, the control unit 11 detects a rate of wireless communication and controls the transmission of image data based on the rate of wireless communication, thus allowing for the appropriate and efficient communication.

Additionally, in the third embodiment, the first unit 10c includes the RAM 17 or the ROM 18 that temporarily stores image data that is not transmitted via wireless communication. Therefore, even when the rate of wireless communication is low and thus image data is not transmitted to the control unit 101, the image data is temporarily stored, and is transmitted to the control unit 101 at the time when the rate of wireless communication recovers.

In the above third embodiment, the process of FIG. 11 can be performed on both a still image and a moving image, but a process for a real time moving image (such as a live view image) may differ from a process for a non-real time moving image. For example, in a case of a non-real time image, a process same as the process of FIG. 11 may be performed, and in a case of a real time image, image data may be discarded without being temporarily stored in the RAM 17 or the ROM 18 when the determination at step S38 is No.

Fourth Embodiment

Figure 12:
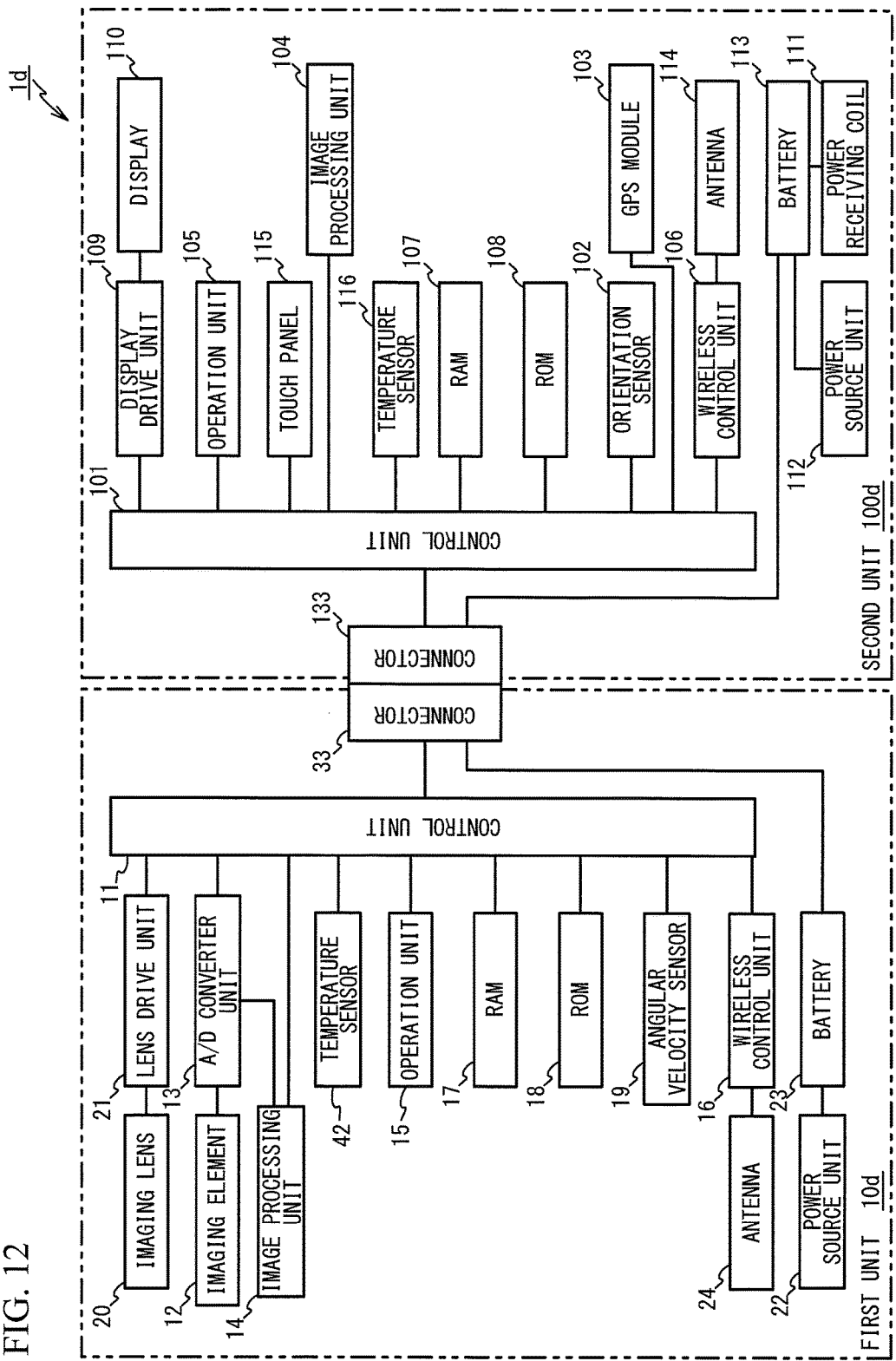
FIG. 12 is a block diagram illustrating a configuration of an image capture device in accordance with a fourth embodiment.

A detailed description will next be given of a fourth embodiment based on FIG. 12~FIG. 14. FIG. 12 is a block diagram illustrating a configuration of an image capture device 1d in accordance with the fourth embodiment. The image capture device 1d includes a first unit 10d and a second unit 100d.

The fourth embodiment differs from the third embodiment in that the first unit 10d includes a temperature sensor 42 and the image processing unit 14. Additionally, the fourth embodiment differs from the third embodiment in that the second unit 100d includes a temperature sensor 116.

The temperature sensors 42 are located around the image processing unit 14 and the wireless control unit 16 to measure temperatures around the image processing unit 14 and the wireless control unit 16. On the other hand, the temperature sensors 116 are located around the image processing unit 104 and the wireless control unit 106 to measure temperatures around the image processing unit 104 and the wireless control unit 106. The temperature sensor 42 is coupled to the control unit 11, and the control unit 11 is coupled to the control unit 101.

A description will next be given of a process executed by the image capture device 1d of the fourth embodiment based on FIG. 13 and FIG. 14. FIG. 13 is a flowchart of a process executed by the image capture device 1d, and FIG. 14 is a flowchart of a concrete process at step S66 of FIG. 13.

Figure 13:
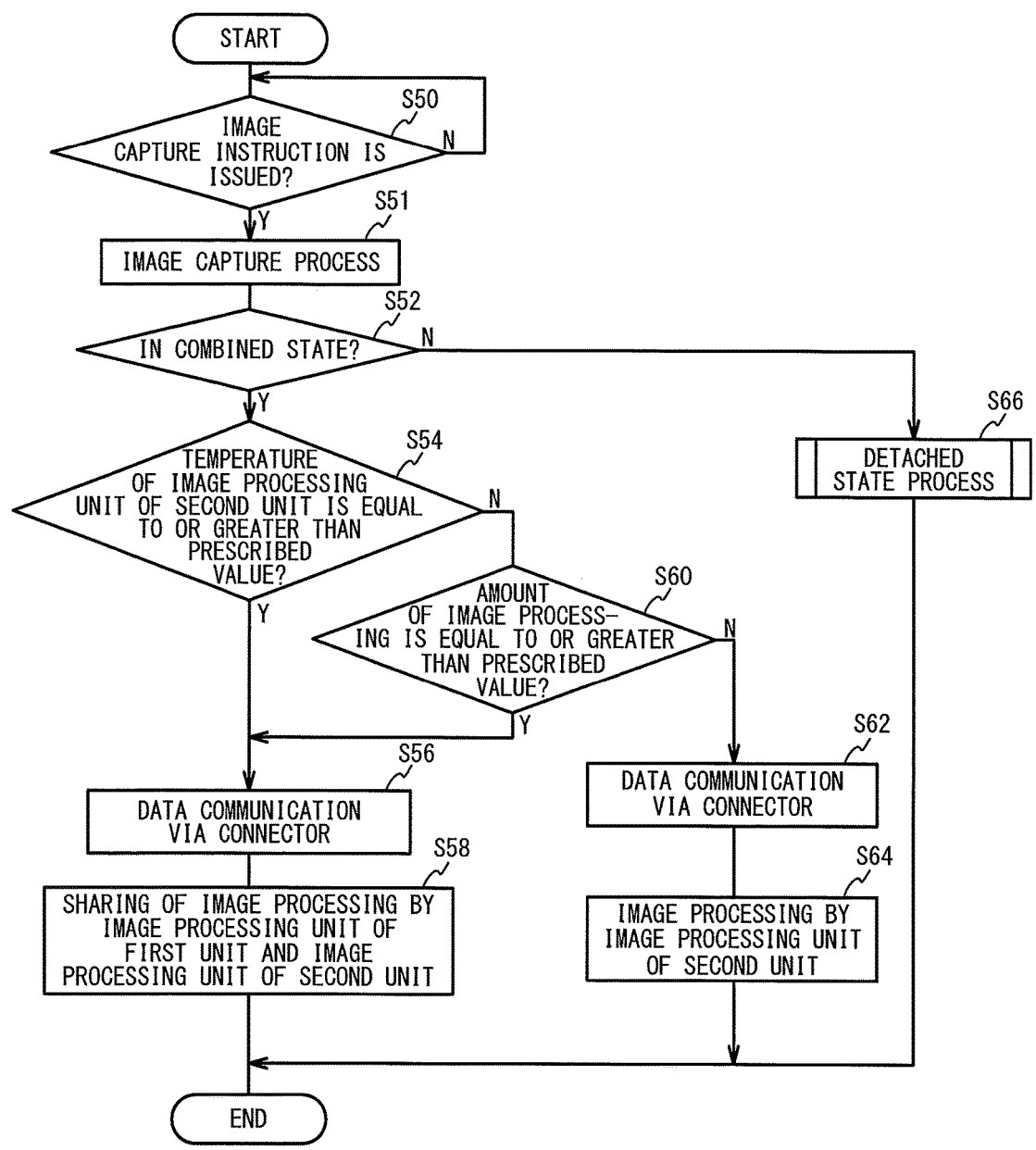
FIG. 13 is a flowchart of a process executed by the image capture device of the fourth embodiment.

In the process of FIG. 13, at step S50, the control unit 11 and the control unit 101 wait till an image capture instruction is issued by the user as with at step S10 of FIG. 9 or at step S30 of FIG. 11. When the control unit 101 receives an image capture instruction, it transmits the image capture instruction to the control unit 11. When an image capture instruction is issued from the user, the process proceeds to step S51.

At step S51, the control unit 11 conducts (starts) image capture using the imaging lens 20 and the imaging element 12 as with at step S11 of FIG. 9 or at step S31 of FIG. 11. In this case, the control unit 11 obtains raw data (a RAW file) on which image processing is not performed yet as data of a digital image signal.

At subsequent step S52, the control unit 11 determines whether the units 10d, 100d are in the combined state as with at step S12 of FIG. 9 or at step S32 of FIG. 11. When the determination here is Yes, the process proceeds to step S54. At step S54, the control unit 11 determines whether the ambient temperature of the image processing unit 104 measured by the temperature sensor 116 of the second unit 100d via the control unit 101 is equal to or greater than a prescribed value. When the determination here is Yes, the process proceeds to step S56, and the control unit 11 transmits a part of the data of the digital image signal input from the A/D converter unit 13 to the control unit 101 of the second unit 100d via the connector 33 and the connector 133. For example, when the data of the digital image signal is moving image data, moving image data captured within a predetermined period of time of moving image data of the entire period of image capture time is transmitted to the control unit 101. Additionally, when the data of the digital image signal is data of continuously-shot still images, data of a predetermined number of images of all the continuously-shot images is transmitted to the control unit 101.

At subsequent step S58, the control unit 11 inputs data that is not transmitted to the control unit 101 among data of the digital image signal input from the A/D converter unit 13 to the image processing unit 14 of the first unit 10d. In this case, the image processing unit 104 performs various types of image processing on the input data of the digital image signal under the instruction of the control unit 11. The image processing unit 14 then inputs the processed image data to the control unit 11. The control unit 11 stores the image data processed by the image processing unit 14 in the ROM 18.

Additionally, at step S58, the control unit 101 of the second unit 100d inputs the data of the digital image signal input from the control unit 11 to the image processing unit 104. The image processing unit 104 performs various types of image processing on the input data of the digital image signal as with the image processing unit 14. The image processing unit 104 inputs the processed image data to the control unit 101. The control unit 101 stores the image data processed by the image processing unit 104 in the ROM 108.

Here, at step S58, after the image processing by the image processing unit 14 and the image processing unit 104, the data on which the image processing has been performed by the image processing unit 14 and the data on which the image processing has been performed by the image processing unit 104 are gathered in the control unit 11 or the control unit 101 to be unified. The unified image data is then stored in the ROM 18 or the ROM 108.

When the image processing unit 104 is used to perform the image processing on all the data under the condition that the ambient temperature of the image processing unit 104 is equal to or greater than the prescribed value, the temperature of the image processing unit 104 further increases, and thus an erroneous processing may be performed. However, in this embodiment, when the determination at step S54 is Yes, the image processing unit 14 and the image processing unit 104 share the image processing. Thus, the load on the image processing unit 104 is reduced, and the occurrence of an erroneous processing due to the increase in temperature is reduced.

The amount of image processing to be performed by the image processing unit 14 and the amount of image processing to be performed by the image processing unit 104 can be determined in accordance with the ambient temperature of the image processing unit 104 and the ambient temperature of the image processing unit 14 measured by the temperature sensor 42 of the first unit 10d.

On the other hand, when the determination at step S54 is No, i.e., when the temperature of the image processing unit 104 of the second unit 100d is less than the prescribed value, the process proceeds to step S60. At step S60, the control unit 11 determines whether the amount of processing on the data of the digital image signal input from the A/D converter unit 13 is equal to or greater than a prescribed value. When the determination here is Yes, steps S56, S58 are performed as described above. As described, when the amount of processing on the data of the digital image signal is equal to or greater than the prescribed value, the image processing unit 14 and the image processing unit 104 share the image processing, thus allowing the image processing to be performed fast (allowing the time for the image processing to be reduced). Here, the amount of image processing to be performed by the image processing unit 14 and the amount of image processing to be performed by the image processing unit 104 can be determined in accordance with the ambient temperature of the image processing unit 104 and the ambient temperature of the image processing unit 14 measured by the temperature sensor 42 as described previously.

When the determination at step S60 is No, the process proceeds to step S62, and the control unit 11 transmits the data of the digital image signal input from the A/D converter unit 13 to the control unit 101 of the second unit 100d via the connectors 33, 133. At subsequent step S64, the control unit 101 inputs the data of the digital image signal input from the control unit 11 to the image processing unit 104. The image processing unit 104 performs various types of image processing on the input data of the digital image signal under the instruction of the control unit 11. The image processing unit 14 inputs the processed image data to the control unit 101. The control unit 101 stores the image data processed by the image processing unit 14 in the ROM 108. In this embodiment, when the image processing by the image processing unit 104 of the second unit 100d causes no problem from the aspects of temperature and the amount of image processing, the image processing unit 104 is used to perform the image processing (step S64). Thus, the generation sources of heat can be separated by using the image processing unit 104, which is located in a unit (the second unit 100d) differing from a unit including the imaging element 12 that generates a lot of heat, for the image processing.

A description will next be given of a process performed when the determination at step S52 is No. When the determination at step S52 is No, a detached state process at step S66 is performed. In the detached state process, the process along a flowchart of FIG. 14 is performed.

Figure 14:
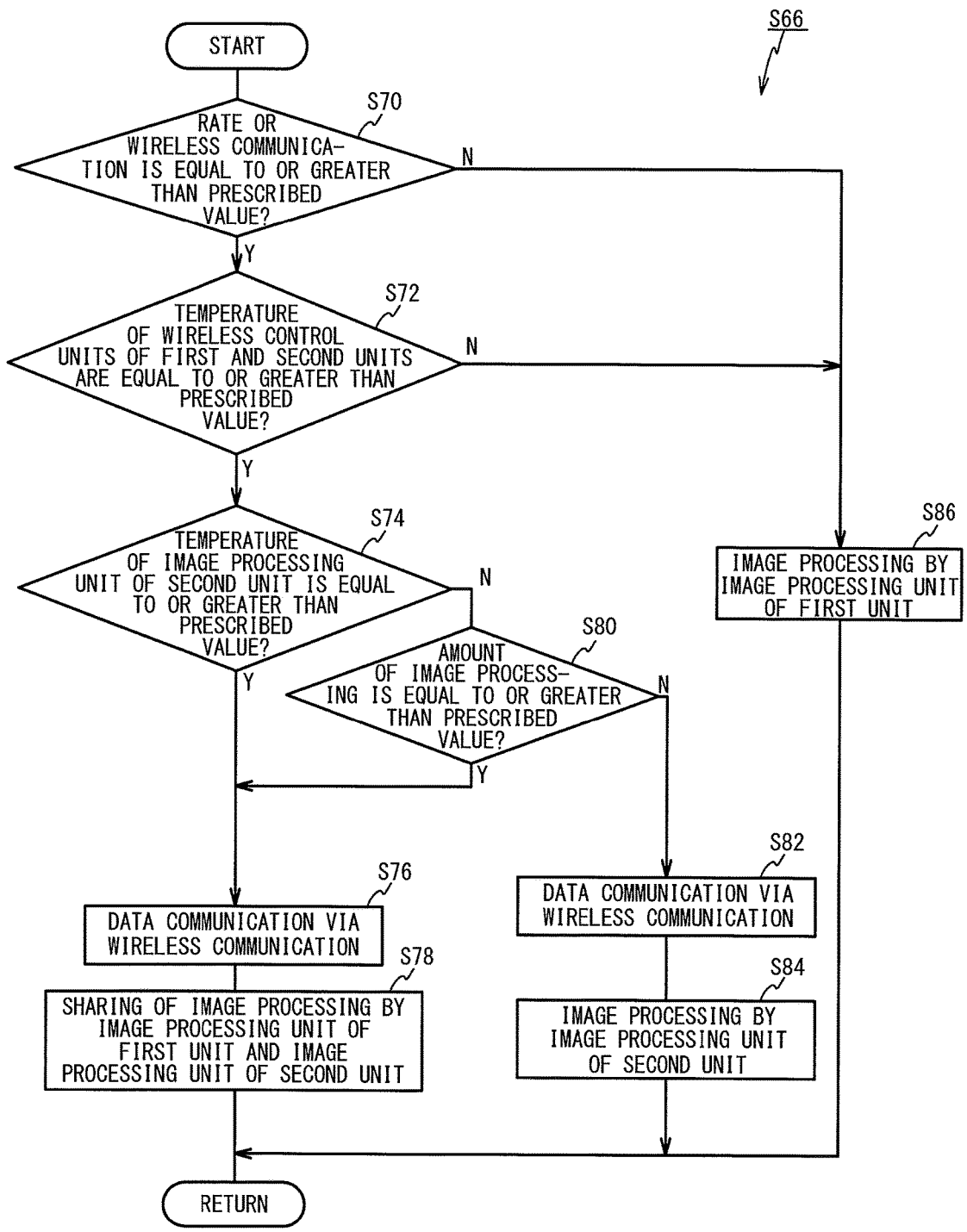
FIG. 14 is a flowchart of a concrete process of step S66 in FIG. 13.

In the process of FIG. 14, at step S70, it is determined whether a rate of wireless communication is equal to or greater than a prescribed value. "The prescribed value of the rate of wireless communication" is a rate at which digital image data can be transmitted within a predetermined period of time. The predetermined period of time differs depending on the file size of the digital image data or the like. When the determination at step S70 is No, the process proceeds to step S86, and the control unit 11 inputs the data of a digital image signal input from the A/D converter unit 13 to the image processing unit 14. The image processing unit 14 performs various types of image processing on the input data of the digital image signal. The image processing unit 14 then inputs the processed image data to the control unit 11. The control unit 11 stores the image data processed by the image processing unit 14 in the ROM 18. Then, the entire process of FIG. 14 and FIG. 13 is ended.

On the other hand, when the determination at step S70 is Yes, the process proceeds to step S72, and the control unit 11 determines whether the temperatures of the wireless control units 16, 106 of the first and second units 10d, 100d are equal to or greater than a prescribed value. When the determination here is No, the wireless control units 16, 106 may have thermal loads when wireless communication is performed. Thus, the control unit 11 proceeds to step S86, and conducts the image processing using the image processing unit 14 as described above. Then, the entire process of FIG. 14, FIG. 13 is ended.

On the other hand, when the determination at step S72 is Yes (when wireless communication can be performed), the process proceeds to step S74. At step S74, the determination same as the determination at step S54 described above (the determination whether the temperature of the image processing unit 104 of the second unit 100d is equal to or greater than a prescribed value) is performed. When the determination at step S74 is Yes, the control unit 11 transmits a part of the data of the digital image signal input from the A/D converter unit 13 to the control unit 101 of the second unit 100d via wireless communication. At subsequent step S78, the process same as the previously described process at step S58 (sharing of the image processing by the image processing units 14, 104 of the first and second units 10d, 100d) is carried out, and the entire process of FIG. 14 and FIG. 13 is ended. In this embodiment, when the determination at step S74 is Yes, the image processing unit 14 and the image processing unit 104 share the image processing (S78). Thus, the load on the image processing unit 104 is reduced, and the occurrence of an erroneous processing due to the increase in temperature can be reduced.

When the determination at step S74 is No, the process proceeds to step S80, and the determination same as the determination at step S60 (the determination whether the amount of image processing is equal to or greater than a prescribed value) is carried out. When the determination here is Yes, the processes of steps S76, S78 are performed as described above. In this embodiment, when the amount of processing on the data of the digital image signal is equal to or greater than a prescribed value, the image processing unit 14 and the image processing unit 104 share the image processing, thus allowing the image processing to be performed fast (allowing the time for the image processing to be reduced). On the other hand, when the determination at step S80 is No, the process proceeds to step S82, and the control unit 11 transmits the data of the digital image signal input from the A/D converter unit 13 to the control unit 101 of the second unit 100d via wireless communication. At subsequent step S84, the process same as the process at step S64 described above (the image processing by the image processing unit 104 of the second unit 100d) is conducted, and the entire process of FIG. 14 and FIG. 13 is ended. As described above, in this embodiment, when the image processing by the image processing unit 104 of the second unit 100d causes no problem from the aspects of temperature and the amount of image processing, the image processing unit 104 is used to perform the image processing (S84). Thus, the generation sources of heat can be separated by using the image processing unit 104, which is located in a unit differing from a unit including the imaging element 12 that generates a lot of heat, for the image processing.

As described in detail above, according to the fourth embodiment, the first unit 10d includes the temperature sensor 42, the second unit 100d includes the temperature sensor 116, and the control unit 11 controls the transmission of image data from the first unit 10d to the second unit 100d based on detection results of the temperature sensors 42, 116. Thus, the fourth embodiment enables to determine which unit of the image processing units 14, 104 is used to perform image processing in accordance with the temperatures (heat generation) of the units 10d, 100d. Therefore, the effect of heat due to the image processing is reduced.

The above fourth embodiment describes a case where the temperature sensors are provided to both the first and second units 10d, 100d, but does not intend to suggest any limitation. The temperature sensor is required to be located at least one of the units 10d, 100d. In this case, a part of the process of FIG. 13 and FIG. 14 may be changed in accordance with the installation method of the temperature sensor. Additionally, the above fourth embodiment describes a case where the temperature sensors 42 of the first unit 10d detect temperatures around the image processing unit 14 and the wireless control unit 16, but does not intend to suggest any limitation, and the temperature sensor 42 may detect a temperature around one of the image processing unit 14 and the wireless control unit 16. Additionally, the above fourth embodiment describes a case where the temperature sensors 116 of the second unit 100d detect temperatures around the wireless control unit 106 and the image processing unit 104, but may detect a temperature around one of the wireless control unit 106 and the image processing unit 104. Also in this case, a part of the process of FIG. 13 and FIG. 14 may be changed in accordance with an object to be detected by the temperature sensors 42, 116.

The above fourth embodiment may employ a sharing method with which, for example, the image processing unit 14 performs image processing on a through image (a live view image), and the image processing unit 104 performs image processing on an image that is actually captured when the image processing unit 14 of the first unit 10d and the image processing unit 104 of the second unit 100d share image processing.

Figure 15A:
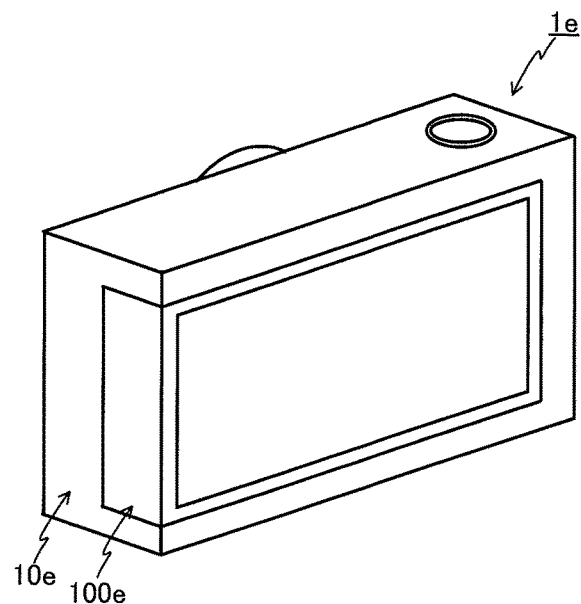
FIG. 15A and FIG. 15B are diagrams for explaining a variation of the embodiment (No. 1)
Figure 15B:
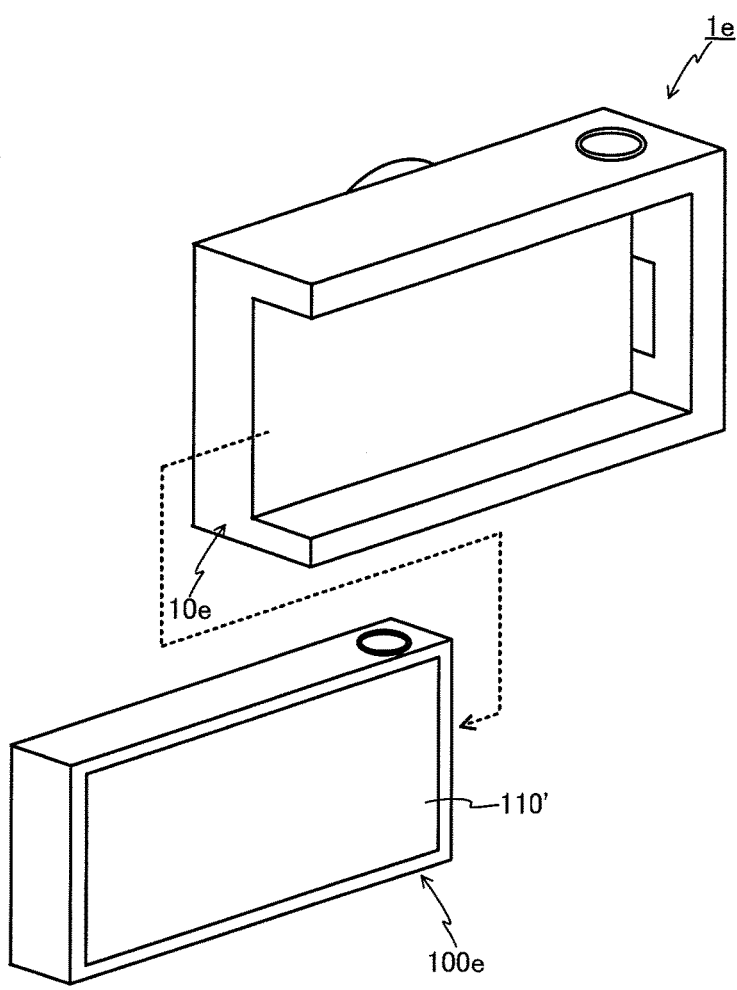
Figure 16A:
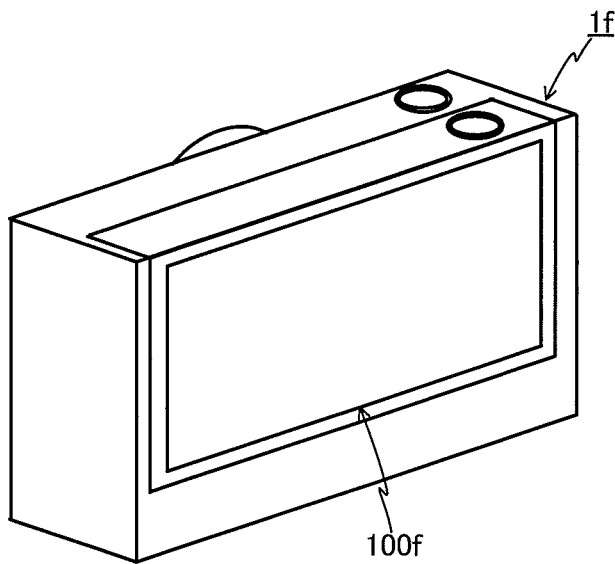
FIG. 16A and FIG. 16B are diagrams for explaining the variation of the embodiment (No. 2).
Figure 16B:
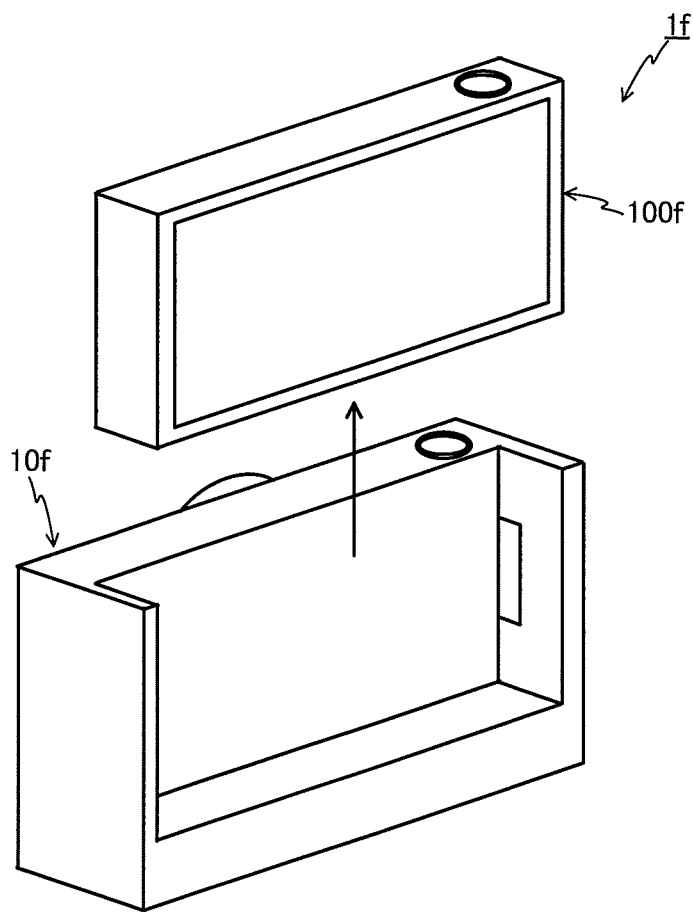

The above embodiments describe a case where the first and second units have configurations illustrated in FIG. 1, but do not intend to suggest any limitation. For example, an image capture device may have a configuration illustrated in FIG. 15A, FIG. 15B. An image capture device 1e of FIG. 15A includes a first unit 10e and a second unit 100e. The second unit 100e can be detached from the first unit 10e by laterally sliding the second unit 100e as illustrated in FIG. 15B. Such a structure is effective when a display 110' of the second unit 100e is made to have a large area like a smartphone and the housing is made to be thin, for example. Alternatively, as illustrated in FIG. 16A, FIG. 16B, an image capture device if having a structure in which a second unit 100f can be slid upward with respect to a first unit 10f may be employed. In this case, in the combined state, two release switches are exposed to the outside as illustrated in FIG. 16A, and thus the release switches may have different functions. For example, a first release switch may have a function to issue an instruction to capture a still image, and a second release switch may have a function to issue an instruction to capture a moving image.

When the second unit 100e (100f) slides with respect to the first unit 10e (10f), a recessed and protrusion portion may be located on surfaces with which each unit makes contact. The provision of the recessed and protrusion portions makes the surface area of each unit (housing) large, thus improving heat release efficiency.

In the above embodiments and their variations, the first unit may include a display. In this case, the display may be located in the attachment portion 25aa of the first unit.

In the above embodiments and their variations, the first unit or the second unit may include a projector capable of projecting a captured image on a wall or a screen.

The components (especially, the orientation sensor 102, the GPS module 103, the power receiving coil 111, and the heat release plate 26) described in the first embodiment, the components (especially, the heat release openings 40, 140) described in the second embodiment, the configuration (especially, the configuration where only the second unit 100c includes the image processing unit 104) described in the third embodiment, and the components (especially, the temperature sensors 42, 116) described in the fourth embodiment may be properly selected to be combined, or the components in one embodiment may be omitted from the components in another embodiment.

While the exemplary embodiments of the present invention have been illustrated in detail, the present invention is not limited to the above-mentioned embodiments, and other embodiments, variations and modifications may be made without departing from the scope of the present invention.

What is claimed is:

1. A camera comprising:
a first operation unit;
an image capture unit that captures an image in response to an operation of the first operation unit;
a communication unit that communicates with an external device including a second operation unit and a detection unit detecting a position or an orientation; and
a storing unit that stores image data generated by the image capture unit, wherein
the communication unit receives at least one of operation information indicating that the second operation unit is operated, and information on the position or information on the orientation from the external device,
the image capture unit captures an image in response to one of an operation of the first operation unit and reception of the operation information,
the storing unit stores the image data and the information on the position or the information on the orientation, and
the first operation unit is a release button or a touch panel.

2. The camera according to claim 1 further comprising:
an attachment portion to which the external device is attached, wherein
the communication unit receives the operation information indicating that the second operation unit is operated and the information on the position or the information on the orientation from the external device in a state where the external device is attached to the attachment portion,
the image capture unit captures the image in response to one of the operation of the first operation unit and the reception of the operation information in the state where the external device is attached to the attachment portion, and
the storing unit stores the image data and the information on the position or the information on the orientation.

3. The camera according to claim 1, wherein
the communication unit receives the operation information and the information on the position detected by the detection unit or the information on the orientation detected by the detection unit, and
the storing unit stores the image data generated by the image capture unit after the operation information is received by the communication unit, and the information on the position or the information on the orientation received by the communication unit.

4. The camera according to claim 1, wherein
the communication unit receives the information on the position detected by the detection unit or the information on the orientation detected by the detection unit after receiving the operation information, and
the storing unit stores the image data generated by the image capture unit after the operation information is received by the communication unit, and the information on the position or the information on the orientation received by the communication unit.

5. The camera according to claim 1, further comprising:
a battery.

6. The camera according to claim 1, further comprising:
a display unit including the first operation unit.

7. The camera according to claim 1, wherein
at least a part of a housing of the camera is made of a non-metal.

8. The camera according to claim 1, further comprising:
an attachment portion to which the external device is attached, wherein
the communication unit performs wireless communication with the external device,
the storing unit stores the image data when the camera does not communicate with the external device through the communication unit in a state where the external device is not attached to the attachment portion, and
the communication unit transmits the image data stored in the storing unit to the external device when communication with the external device is established.

9. The camera according to claim 8, wherein
the storing unit does not store a live view image data and stores a still image data among the image data when the camera does not communicate with the external device through the communication unit.

10. The camera according to claim 9, wherein
the communication unit transmits the still image data stored in the storing unit to the external device when communication with the external device is established.

11. The camera according to claim 8, wherein
the storing unit deletes, after the image data is transmitted to the external device by the communication unit, the image data transmitted.

12. A camera comprising:
an image capture unit that captures an image;
a storing unit that stores image data generated by the image capture unit;
a wireless communication unit that performs wireless communication with an external device; and
an attachment portion to which the external device is attached, wherein the storing unit does not store a live view image data and stores a still image data among the image data when the camera does not communicate with the external device through the wireless communication unit in a state where the external device is not attached to the attachment portion, and the wireless communication unit transmits the image data stored in the storing unit to the external device when communication with the external device is established.

13. The camera according to claim 12, wherein
the wireless communication unit transmits the still image data stored in the storing unit to the external device when communication with the external device is established.

14. The camera according to claim 12, wherein
the storing unit deletes, after the image data is transmitted to the external device by the wireless communication unit, the image data transmitted.

15. The camera according to claim 12, further comprising:
a first operation unit, wherein
the image capture unit captures the image in response to an operation of the first operation unit,
the wireless communication unit receives at least one of operation information indicating that a second operation unit included in the external device is operated, and information on a position or information on an orientation detected by a detection unit included in the external device,
the image capture unit captures the image in response to one of the operation of the first operation unit and reception of the operation information, and
the storing unit stores the image data and the information on the position or the information on the orientation.

16. The camera according to claim 15, wherein
the wireless communication unit receives the operation information indicating that the second operation unit is operated and the information on the position or the information on the orientation from the external device in a state where the external device is attached to the attachment portion,
the image capture unit captures the image in response to one of the operation of the first operation unit and the reception of the operation information in the state where the external device is attached to the attachment portion, and
the storing unit stores the image data and the information on the position or the information on the orientation.

17. The camera according to claim 15, wherein
the wireless communication unit receives the operation information and the information on the position detected by the detection unit or the information on the orientation detected by the detection unit, and
the storing unit stores the image data generated by the image capture unit after the operation information is received by the wireless communication unit, and the information on the position or the information on the orientation received by the wireless communication unit.

18. The camera according to claim 15, wherein
the wireless communication unit receives the information on the position detected by the detection unit or the information on the orientation detected by the detection unit after receiving the operation information, and
the storing unit stores the image data generated by the image capture unit after the operation information is received by the wireless communication unit, and the information on the position or the information on the orientation received by the wireless communication unit.

19. The camera according to claim 12, further comprising:
a battery.

20. The camera according to claim 15, further comprising:
a display unit including the first operation unit.

21. The camera according to claim 12, wherein
at least a part of a housing of the camera is made of a non-metal.

22. The camera according to claim 15, wherein
the first operation unit is a release button or a touch panel.

* * * * *